United States Patent
Angell

(10) Patent No.: US 9,454,363 B1
(45) Date of Patent: Sep. 27, 2016

(54) MOBILE APPLICATION DEVELOPMENT SYSTEM AND METHOD

(71) Applicant: DSI Acquisition Corporation, Kansas City, MO (US)

(72) Inventor: Matthew J. Angell, Prairie Village, KS (US)

(73) Assignee: Data Systems International, Inc., Overland Park, KS (US)

( * ) Notice: Subject to any disclaimer, the term of this patent is extended or adjusted under 35 U.S.C. 154(b) by 0 days.

(21) Appl. No.: 14/212,316

(22) Filed: Mar. 14, 2014

Related U.S. Application Data

(60) Provisional application No. 61/793,928, filed on Mar. 15, 2013.

(51) Int. Cl.
  *G06F 9/44* (2006.01)
  *G06F 9/445* (2006.01)

(52) U.S. Cl.
  CPC .. *G06F 8/71* (2013.01); *G06F 8/61* (2013.01)

(58) Field of Classification Search
  USPC .......................................................... 717/173
  See application file for complete search history.

(56) References Cited

U.S. PATENT DOCUMENTS

| | | | | |
|---|---|---|---|---|
| 7,444,410 B1* | 10/2008 | Hichwa | ............. | G06F 17/30864 709/203 |
| 8,811,968 B2* | 8/2014 | Aiglstorfer | ......... | G06F 9/45504 455/418 |
| 9,146,732 B2* | 9/2015 | Aiglstorfer | ......... | G06F 9/45504 |
| 2003/0060284 A1* | 3/2003 | Hamalainen | ............. | G09B 7/02 463/42 |
| 2004/0240408 A1* | 12/2004 | Gur | ........................... | G06F 8/61 370/328 |
| 2008/0003991 A1* | 1/2008 | Sievers | ..................... | G06F 8/65 455/418 |
| 2008/0274716 A1* | 11/2008 | Fok | ....................... | H04W 12/08 455/410 |
| 2009/0131035 A1* | 5/2009 | Aiglstorfer | ......... | G06F 9/45504 455/419 |
| 2010/0175062 A1* | 7/2010 | Kim | ......................... | G06F 8/65 717/173 |
| 2011/0161912 A1* | 6/2011 | Eteminan | .................. | G06F 8/20 717/101 |
| 2013/0019237 A1* | 1/2013 | Pardehpoosh et al. | ....... | 717/171 |
| 2014/0007074 A1* | 1/2014 | Sporkert | .................. | G06F 8/68 717/172 |
| 2014/0068595 A1* | 3/2014 | Belinsky | .................... | G06F 8/65 717/173 |
| 2014/0143752 A1* | 5/2014 | Rumer | ..................... | G06F 8/30 717/106 |

\* cited by examiner

*Primary Examiner* — Marina Lee
(74) *Attorney, Agent, or Firm* — Shook, Hardy & Bacon L.L.P.

(57) ABSTRACT

A system includes one or more processors to receive a first commitId and a first version number of a first version of an app from a mobile computing device downloaded from an app repository computer system, retrieve a second commitId and a second version number of a second version of the app from a production repository, compare the first commitId and the first version number with the second commitId and the second version number and determine that the first commitID is different from the second commitId, determine at least one difference between the first version of the app and the second version of the app, create a file comprising the at least one difference between the first version of the app and the second version of the app, and transmit the file comprising the at least one difference to the mobile computing device.

35 Claims, 15 Drawing Sheets

MOBILE APPLICATION DEVELOPMENT SYSTEM AND METHOD

RELATED APPLICATIONS

This application claims the benefit of priority to U.S. Provisional Application No. 61/793,928, filed Mar. 15, 2013, entitled "Mobile Application Development Platform," the entire contents of which are hereby incorporated by reference.

FEDERALLY SPONSORED RESEARCH OR DEVELOPMENT

Not Applicable.

COMPACT DISK APPENDIX

Not Applicable.

BACKGROUND

Mobile applications (i.e., apps) are software applications designed to run on portable devices, such as mobile phones, tablet computers, and personal digital assistants. Accelerating mobile adoption has been driving a booming mobile apps industry. By recent accounts, companies will spend approximately $100 billion annually building and managing apps by 2015, which is up from $25 billion spent in 2012.

Apps are usually made available through application distribution platforms that are typically administered by the owner of the mobile operating system. While some apps are free, others are purchased. For apps that are purchased, a certain portion of the proceeds goes to the distribution provider while the rest goes to the developer of the app.

Nevertheless, the development of apps has heretofore been difficult for several reasons. First, owing to the broad range of portable devices available in the market, each app must often be ensured for proper functionality on each device, requiring separate development teams and cycles for each different type of portable devices. For example, portable devices in use today may operate with differing operating systems, such as the IOS™ and ANDROID™ operating systems. Furthermore, each portable device may differ greatly from one another, even among those developed by the same manufacturer. Second, apps are typically compiled from source code to maintain relatively stringent size and performance constraints associated with their use on portable devices, which often have limited storage and processing power. The compilation of these apps, however, may generate an undue burden for developers who must re-compile the software code each time a change to the app is made. Additionally, periodic updates to the app often necessitate re-downloading the entire app with each updated version.

SUMMARY

According to one embodiment, a mobile application development platform includes an app development environment configured to generate one or more extensible markup language (XML) files and other assets representing an app to be executed on a particular type of portable device, and an XML interpreter engine configured to be installed in a portable device. When installed in the portable device, the engine may receive the XML file from the app development environment, and interpret code of the XML file to execute at least one feature associated with one or more components that are unique to the portable device.

Embodiments of the present disclosure may include certain advantages. For example, the XML-based app description language (ADL) may allow users to create apps between 50-80 percent (%) faster than with traditional native tools and languages, and 30-40 percent (%) faster than with hypertext markup language, version 5 (HTML5). Embodiments of the platform make it easy to build native cross-platform apps for operating systems, such as IOS™, ANDROID™ and the like. In a particular example, a native app for a children's game took seventeen days to develop with a one person team (minus media production) using traditional methods. The end result encompassed 13,789 lines of Objective-C code. The same individual ported the entirety of the app to an XML-based app description language (ADL) used by the platform in two days using only 259 lines of code, with a result indistinguishable from the original.

According to one embodiment, a system includes one or more processors to receive a first commitId and a first version number of a first version of an app from a mobile computing device downloaded from an app repository computer system, retrieve a second commitId and a second version number of a second version of the app from a production repository, compare the first commitId and the first version number of the first version of the app with the second commitId and the second version number of the second version of the app and determine that the first commitID is different from the second commitId, determine at least one difference between the first version of the app and the second version of the app, create a file comprising the at least one difference between the first version of the app and the second version of the app, and transmit the file comprising the at least one difference to the mobile computing device.

According to another embodiment, a system includes one or more processors to receive login information from a developer computer, compare the login information with user account information in a database and determine that the login information is correct, transmit app development studio information to the developer computer, the app development studio information comprising a first version of an app project for editing using a web browser, receive a second version of the app project from the developer computer, the second version of the app project comprising an extensible markup language (XML) file having application description language (ADL) code, create an app snapshot of the second version of the app project and store the XML file with the ADL code in a development repository, and transmit the app snapshot with an engine for parsing the XML file with the ADL code to a mobile computing device for testing.

According to an additional embodiment, a system includes one or more processors to download and install a first version of an app with an engine from an app repository computer system, the app having a first version number, a first commitId, and at least one extensible markup language (XML) file comprising application description language (ADL) code, launch the app and transmit the first version number and the first commitId to an app development computer system, receive a file comprising at least one difference between the first version of the app and a second version of the app with the engine stored on the app development computer system, the second version of the app having a second version number, a second commitID and at least one XML file comprising ADL code, extract contents of the file comprising the at least one difference between the first version of the app and the second version of the app stored on the app development computer system to update the first version of the app to the second version of the app by updating an internal commitId from the first commitId to the second commitId, parse the XML ADL code in the second version of the app using the engine, and execute the second version of the app using the engine.

According to a further embodiment, a method includes receiving, by at least one processor, a first commitId and a first version number of a first version of an app from a mobile computing device downloaded from an app repository computer system, retrieving, by the at least one processor, a second commitId and a second version number of a second version of the app from a production repository, comparing, by the at least one processor, the first commitId and the first version number of the first version of the app with the second commitId and the second version number of the second version of the app and determining that the first commitID is different from the second commitId, determining, by the at least one processor, at least one difference between the first version of the app and the second version of the app, creating, by the at least one processor, a file comprising the at least one difference between the first version of the app and the second version of the app, and transmitting, by the at least one processor, the file comprising the at least one difference to the mobile computing device.

According to an even further embodiment, a method includes receiving, by at least one processor, login information from a developer computer, comparing, by the at least one processor, the login information with user account information in a database and determining that the login information is correct, transmitting, by the at least one processor, app development studio information to the developer computer, the app development studio information comprising a first version of an app project for editing using a web browser, receiving, by the at least one processor, a second version of the app project from the developer computer, the second version of the app project comprising an extensible markup language (XML) file having application description language (ADL) code, creating, by the at least one processor, an app snapshot of the second version of the app project and storing the XML file with the ADL code in a development repository, and transmitting, by the at least one processor, the app snapshot with an engine for parsing the XML file with the ADL code to a mobile computing device for testing.

According to another embodiment, a method includes downloading and installing, by at least one processor, a first version of an app with an engine from an app repository computer system, the app having a first version number, a first commitId, and at least one extensible markup language (XML) file comprising application description language (ADL) code, launching, by the at least one processor, the app and transmitting the first version number and the first commitId to an app development computer system, receiving, by the at least one processor, a file comprising at least one difference between the first version of the app and a second version of the app with the engine stored on the app development computer system, the second version of the app having a second version number, a second commitID and at least one XML file comprising ADL code, extracting, by the at least one processor, contents of the file comprising the at least one difference between the first version of the app and the second version of the app stored on the app development computer system to update the first version of the app to the second version of the app by updating an internal commitId from the first commitId to the second commitId, parsing, by the at least one processor, the XML ADL code in the second version of the app using the engine, and executing, by the at least one processor, the second version of the app using the engine.

In an even further embodiment, a non-transitory computer-readable medium includes instructions stored thereon that, when executed by at least one processor, cause the at least one processor to perform operations comprising receiving a first commitId and a first version number of a first version of an app from a mobile computing device downloaded from an app repository computer system, retrieving a second commitId and a second version number of a second version of the app from a production repository, comparing the first commitId and the first version number of the first version of the app with the second commitId and the second version number of the second version of the app and determining that the first commitID is different from the second commitId, determining at least one difference between the first version of the app and the second version of the app, creating a file comprising the at least one difference between the first version of the app and the second version of the app, and transmitting the file comprising the at least one difference to the mobile computing device.

According to an additional embodiment, a non-transitory computer-readable medium includes instructions stored thereon that, when executed by at least one processor, cause the at least one processor to perform operations comprising receiving login information from a developer computer, comparing the login information with user account information in a database and determining that the login information is correct, transmitting app development studio information to the developer computer, the app development studio information comprising a first version of an app project for editing using a web browser, receiving a second version of the app project from the developer computer, the second version of the app project comprising an extensible markup language (XML) file having application description language (ADL) code, creating an app snapshot of the second version of the app project and storing the XML file with the ADL code in a development repository, and transmitting the app snapshot with an engine for parsing the XML file with the ADL code to a mobile computing device for testing.

In another embodiment, a non-transitory computer-readable medium includes instructions stored thereon that, when executed by at least one processor, cause the at least one processor to perform operations comprising downloading and installing a first version of an app with an engine from an app repository computer system, the app having a first version number, a first commitId, and at least one extensible markup language (XML) file comprising application description language (ADL) code, launching the app and transmitting the first version number and the first commitId to an app development computer system, receiving a file comprising at least one difference between the first version of the app and a second version of the app with the engine stored on the app development computer system, the second version of the app having a second version number, a second commitID and at least one XML file comprising ADL code, extracting contents of the file comprising the at least one difference between the first version of the app and the second version of the app stored on the app development computer system to update the first version of the app to the second version of the app by updating an internal commitId from the first commitId to the second commitId, parsing the XML ADL code in the second version of the app using the engine, and executing the second version of the app using the engine.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

DETAILED DESCRIPTION

Figure 1:
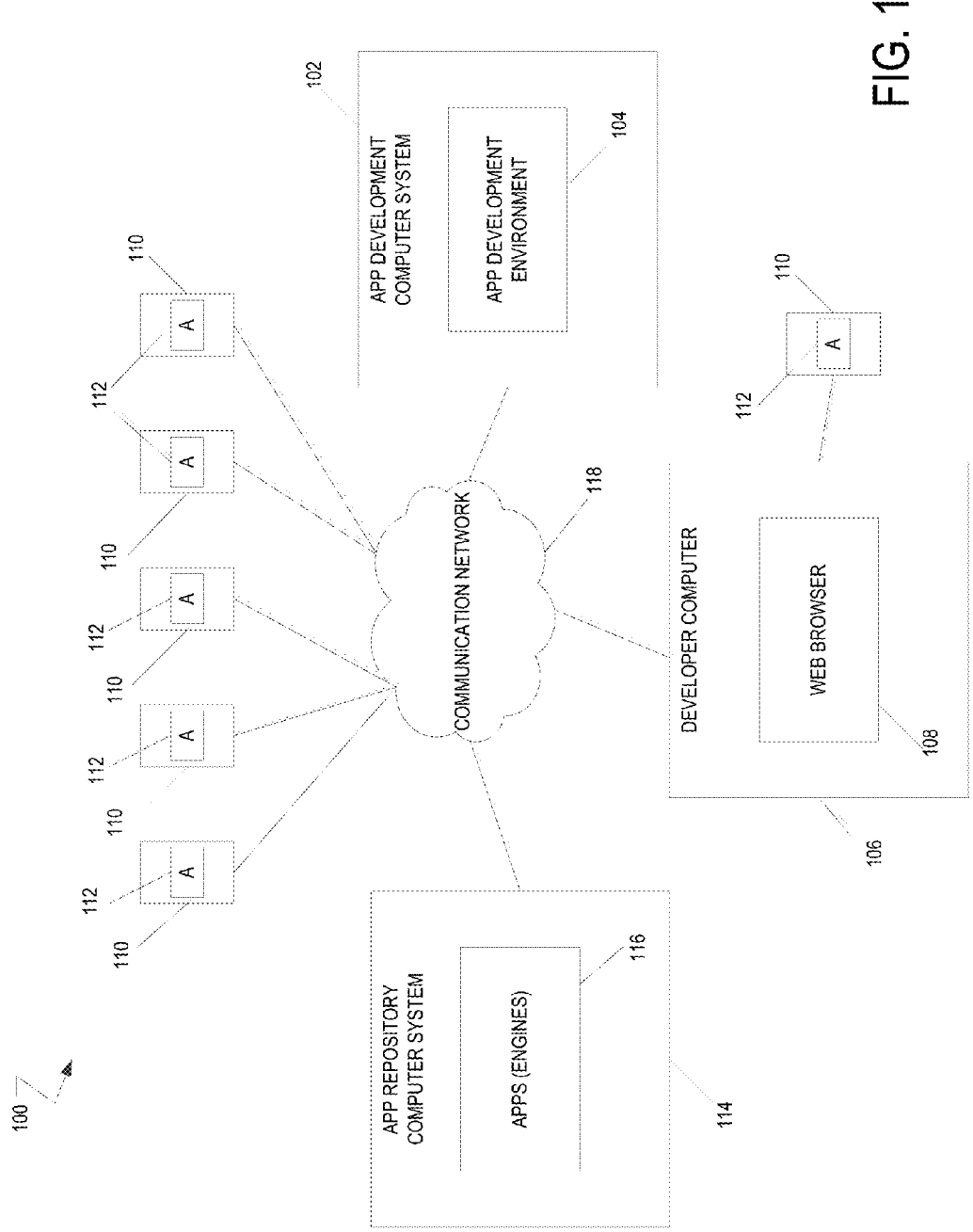
FIG. 1 is a block diagram of a mobile application development system according to one aspect of the present disclosure.

Embodiments of the present disclosure provide a mobile application development system and method that may be used for the development of apps and the distribution of apps to the end consumer. The system uses extensible markup language (XML) interpreter engines residing on each mobile computing device that provide app-like functionality by interpreting one or more XML files and other assets representing an executable app. The XML file includes instructions conforming to a XML-based app description language (ADL). In various embodiments, the XML file is comprised entirely of XML based instructions such that the interpreter engine on each portable device provides the app-like functionality of each XML file solely from instructions written in the XML-based ADL.

Aspects of the platform include app development that is accomplished without the use of Java, Objective-C, and other complex languages. Each app is based on XML, modeling the app universe in an elegant yet practical way that opens up the audience of potential users to front end developers, graphic artists, and designers who may be familiar with HTML programming, but not with complex language programming skills.

Other aspects of the platform include a cloud-based platform-as-a-service (PaaS) that frees professional developers from the burdens of app development to focus on advanced design and implementation, while enabling front end developers who are not necessarily proficient programmers to quickly design (e.g., build) and deliver (e.g., manage) powerful native cross-platform apps.

Example XML including ADL for parsing, interpretation, and conversion by an engine is shown below. The engine generates computer-readable instructions that when executed by a mobile computing device causes the mobile computing device to display "Hello World!" in courier font in black on a white background in the middle of a display. According to an example embodiment, the example XML including ADL may be parsed, interpreted, and converted by different types of mobile computing devices, providing a nearly similar result, despite hardware, run-time system, and other differences between the mobile computing devices.

Each XML file comprising ADL includes a <wire></wire> set of tags that surround all other aspects of the app. Next, a <main></main> set of tags may include one or more panels that are described between a set of <panel> tags. Panels may represent just about anything within an app, such as containers for other objects. The example shown below builds a simple panel that takes up 100% of the display with a white background.

<panel> is the foundation for the presentation layer of ADL. A <panel> may serve as a container, an interaction point or be used with a series of other embedded panels and/or object types to create custom graphics such as buttons, menus, shadowing, framing, grid layouts or other new objects for unique purposes throughout the ADL.

A <panel>'s geometry is defined in square or rectangle geometries. All nested objects within will have their geometries defined using the parent object as a base, therefore an embedded object with a defined width of 50%, contained in a parent object with a width of 1000 px will have a width of 500 px when drawn. Children of a panel will function under any inherited attributes from their parent.

Inside the <panel></panel> set of tags, there is a <text></text> set of tags. The <panel> tag is a child of the <main> tag, and the <text> tag is a child of the panel. Text, like other object tags within the <wire> tag may include a variety of attributes used to customize the look and feel of the text. In the example shown below, there are optional font, color, size, and alignment attributes in addition to the required height and width attributes. This example XML file including seven lines of ADL demonstrates the power of the embodiments described herein that may be used to build native cross-platform apps for different mobile computing devices having different operating systems, such as IOS™, ANDROID.™

```
<wire>
<main>
<panel name="panel" width="100%" height="100%"
    background="#ffffff">
    <text name="main" width="110" height="100"
        color="#000000"    font="courier"    size="14"
        align="center"
        valign="center" text="Hello world!"></text>
</panel>
</main>
</wire>
```

FIG. 1 illustrates a block diagram of a mobile application development system 100 according to an example embodiment. The mobile application development system 100 provides systems and methods for developing apps for execution by mobile computing devices.

According to an aspect of the present disclosure, the mobile application development system 100 includes one or more app development computer systems 102. The app development computer system 102 includes an app development environment 104. The app development environment 104 may be a non-distributed system or a distributed system. In other words, the app development environment 104 may include one or more computers having the app development environment 104 that includes components located on the one or more app development computer systems 102. The mobile application development system 100 further comprises one or more development computers 106 having a web browser 108, one or more mobile computing devices 110 (e.g., a smart phone, a tablet, a laptop, a desktop computer, etc.) having an app with an engine 112, and one or more app repository computer systems 114 storing and serving one or more apps with an engine 116.

The mobile application development system 100 includes one or more computers that communicate using a communication network 118. The one or more computers communicate and coordinate their actions by passing messages over the communication network 118. The network can be the Internet, an intranet, a cellular communications network, a WiFi network, a packet network, or another wired or wireless communication network. As an example, the one or more computers communicate data in packets, messages, or other communications using a common protocol, e.g., Hypertext Transfer Protocol (HTTP). As an example, the mobile application development system 100 may be a cloud-based computer system.

Figure 2:
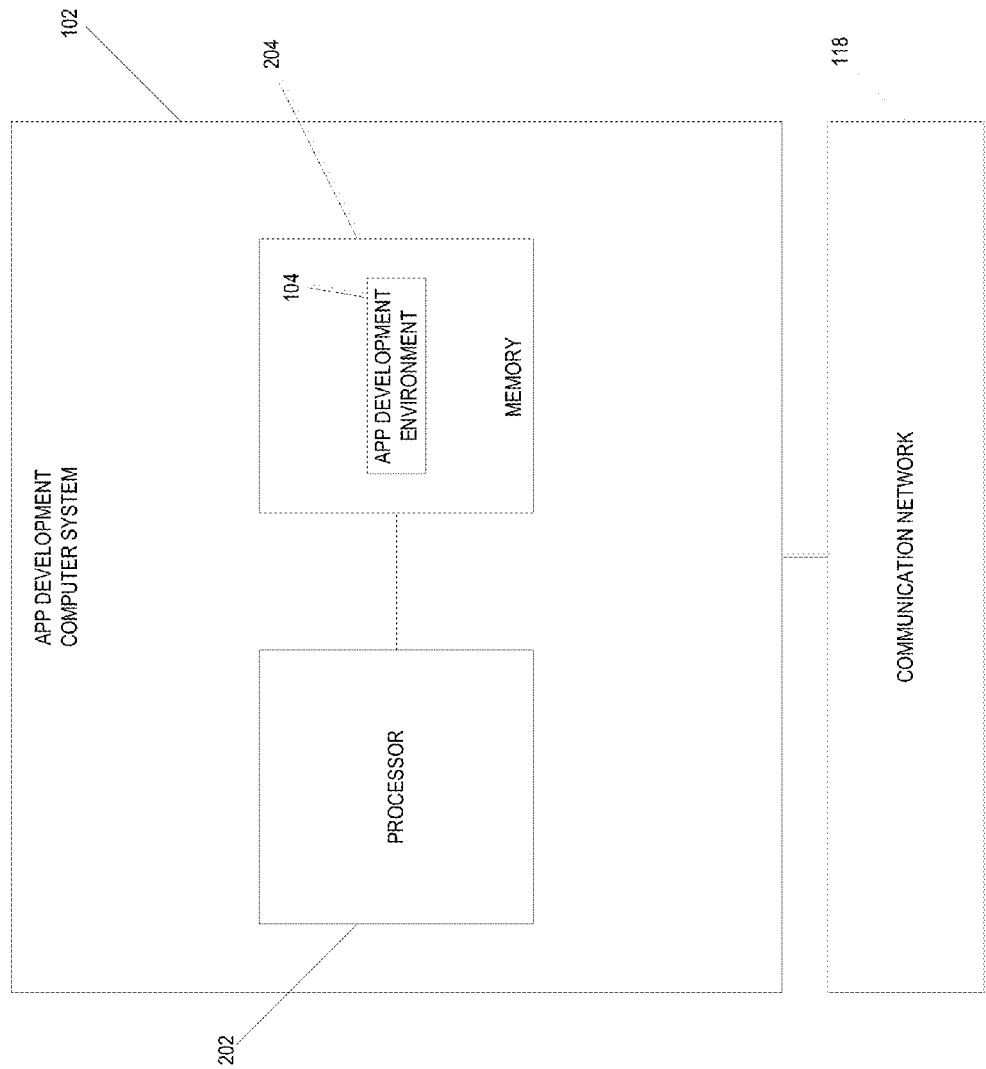
FIG. 2 is a block diagram that depicts an app development computer system according to one embodiment of the present disclosure.

FIG. 2 illustrates a block diagram of the app development computer system 102 according to an example embodiment. According to an aspect of the present disclosure, the app development computer system 102 is a computer having a processor and memory. The app development computer system 102 may be, for example, a laptop, desktop, a server, tablet computer, mobile computing device (e.g., a smart phone) or a dedicated electronic device having a processor and memory. In one exemplary embodiment, the app development computer system 102 is a server.

The app development computer system 102 includes one or more processors 202 to process data and memory 204 to store data including the app development environment 104. The processor 202 and memory 204 are hardware. The memory 204 includes non-transitory memory, e.g., random access memory (RAM) and one or more hard disks. The non-transitory memory may include any tangible computer-readable medium including, for example, magnetic and/or optical disks, flash drives, and the like. The data associated with the app development environment 104 may be stored in a structured query language (SQL) server database or another appropriate database management system within memory 204. Additionally, the memory 204 may also include a dedicated file server having one or more dedicated processors, random access memory (RAM), a Redundant Array of Inexpensive Disks hard drive configuration, an Ethernet interface or other communication interface, and a server-based operating system.

The app development environment 104 may be a software system for creating, editing, updating, and deleting apps having an engine 112 that comprises a plurality of components that together make up the entire app development environment 104. The app development environment 104 is a software system comprising machine/computer-readable executable instructions that are executed by the processor 202 or another processor. The app development environment 104 has access to information that may be stored within memory 204.

In one example, the app development environment 104 stored in memory 204 may include components for providing a web-based app development environment having an app creation studio providing the ability to create, edit, update, and delete one or more apps in an app library or portfolio. Each app in the app library or portfolio may include one or more file comprising one or more XML ADL code files, app assets including images, audio, video, etc., and an app icon. A developer may use the app creation studio to create a snapshot of an app and commit the data associated with the snapshot to the memory 204. As an example, the app development environment 104 may be stored in non-transitory memory.\

Additionally, the app development environment 104 stored in memory 204 may include a database of user account information associated with authorized developers. The user information may include usernames, passwords, email addresses, and billing information, among other information.

Figure 3:
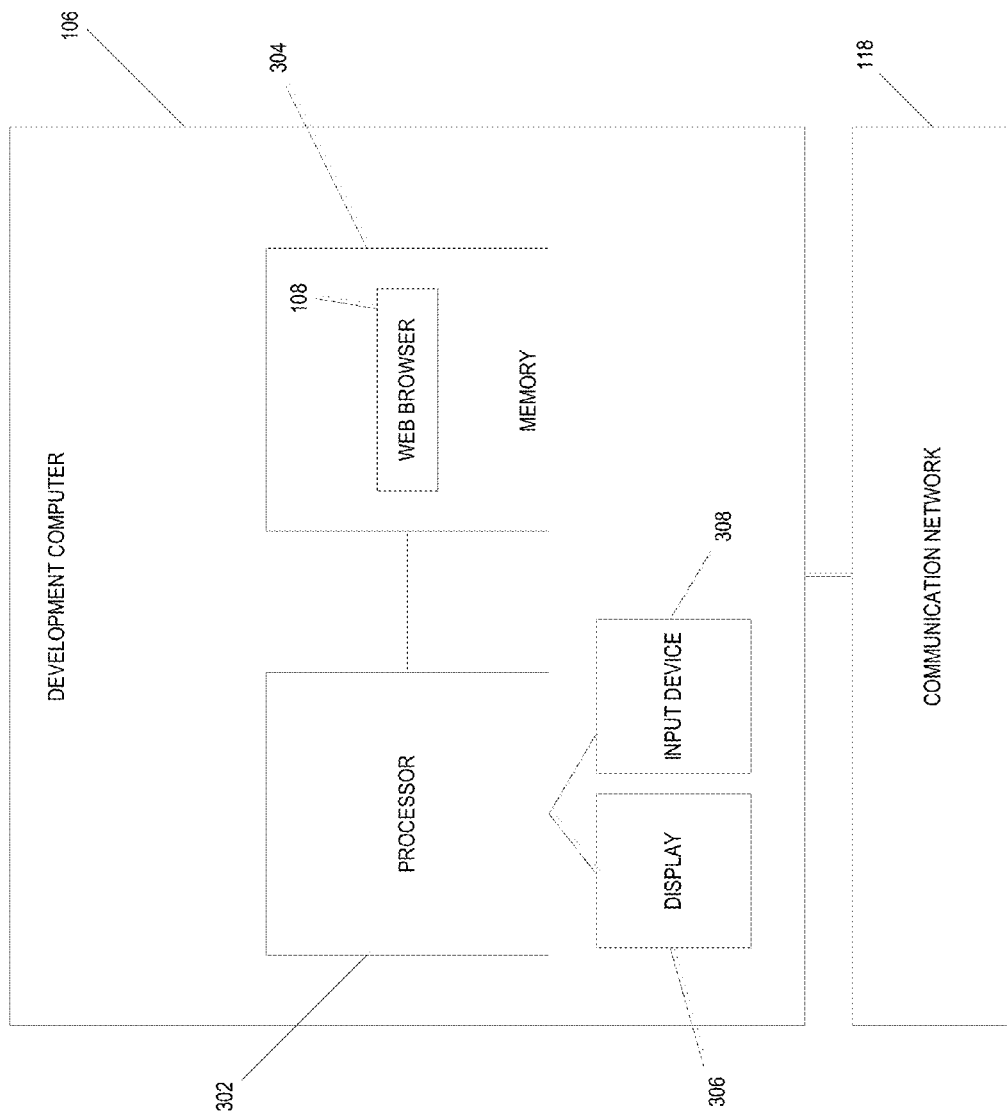
FIG. 3 is a block diagram of a developer computer according to one aspect of the present disclosure.

FIG. 3 illustrates a block diagram of the development computer 106 according to an example embodiment. According to an aspect of the present disclosure, the development computer 106 is a computer having a processor and memory including but not limited to a laptop, desktop, tablet computer, mobile computing device (e.g., a smart phone) or a dedicated electronic device having a processor and memory. In one exemplary embodiment, the development computer 106 is a desktop or a laptop.

The development computer 106 includes one or more processors 302 to process data and memory 304 to store data including a web browser 108 and other optional programs for app development including media editors for creating and editing media and text editors for drafting documents including extensible markup language (XML) documents. The processor 302 and memory 304 are hardware. The memory 304 includes non-transitory memory, e.g., random access memory (RAM) and one or more flash disks or hard drives. The non-transitory memory may include any tangible computer-readable medium including, for example, magnetic and/or optical disks, flash drives, and the like.

The web browser 108 (e.g., a browser) is a software application for retrieving, presenting, and traversing information resources available on the world wide web. An information resource may be identified by a uniform resource locator (URL) or uniform resource identifier (URI), and may be a web page, an image, other types of media, or other piece of content. The web browser 108 allows a user to transmit and receive information, including hypertext markup language (HTML) documents, extensible markup language (XML) documents, and other files from servers, including the app development computer 102. The developer may use the web browser 108 to transmit and receive messages to the web-based app development environment 104 provided by the app development computer 102. In one example, the web browser 108 may be used to create, edit, update, and delete apps in the app creation studio using the app development environment 104 provided by the app development computer 102. The web browser may be used to 108 edit and transmit one or more file comprising one or more XML ADL code files, app assets including images, audio, video, etc., and an app icon to the app development environment for storage in memory 204.

The development computer 106 further includes a display 306 and an input device 308. The display 306 is used to display visual components of web pages displayed by the web browser 108, such as a user interface of the app development environment 104. The display 306 can include a cathode-ray tube display, a liquid-crystal display, a light-emitting diode display, a touch screen display, and other displays. The input device 308 is used to interact with the web browser 108 and may include a mouse, a keyboard, a trackpad, and/or the like. The input device 308 may be included within the display 306 if the display is a touch screen display.

Figure 4:
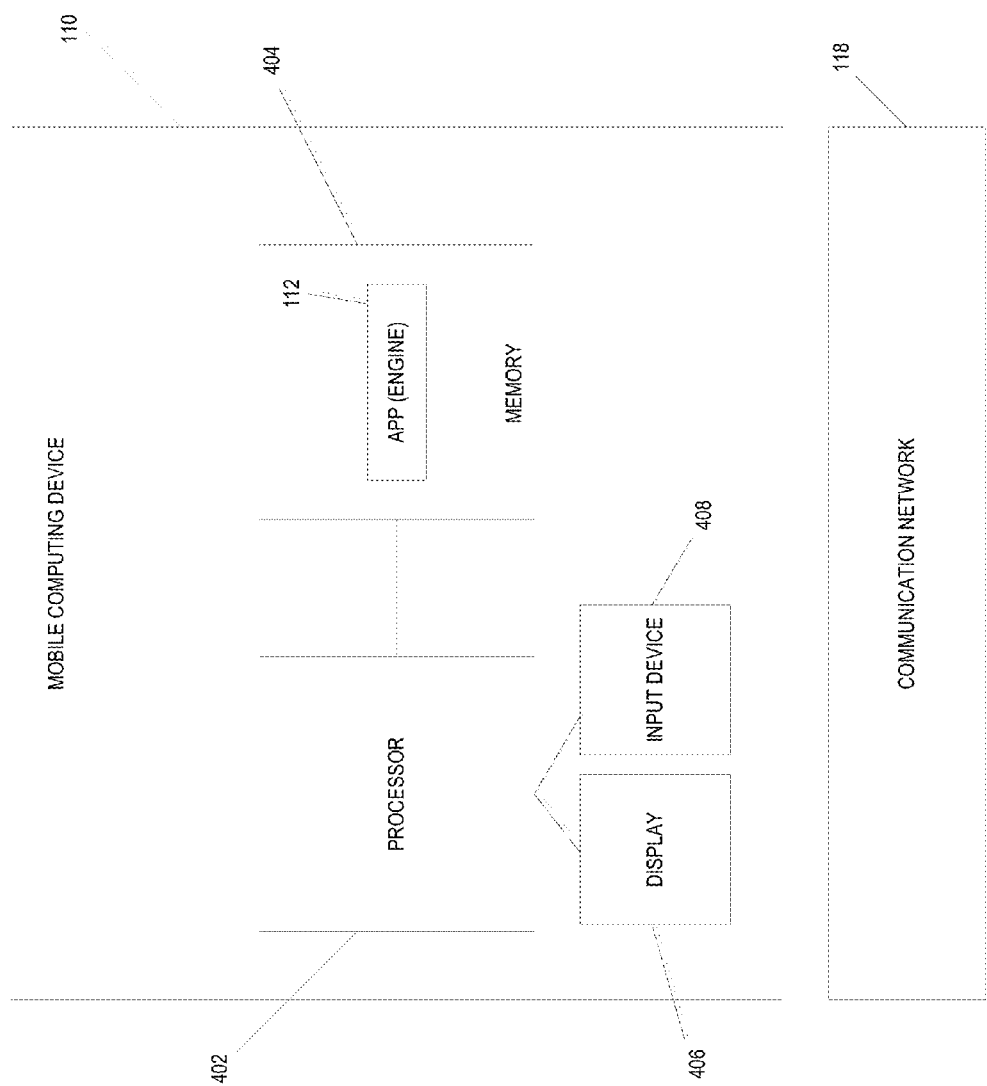
FIG. 4 shows a block diagram of a mobile computing device according to an example embodiment.

FIG. 4 illustrates a block diagram of the mobile computing device 110 according to an example embodiment. According to an aspect of the present disclosure, the mobile computing device 110 is a computer having a processor and memory including but not limited to a laptop, desktop, tablet computer, mobile computing device (e.g., a smart phone) or a dedicated electronic device having a processor and memory. In one exemplary embodiment, the mobile computing device 110 is a smart phone or a tablet.

The mobile computing device 110 includes one or more processors 402 to process data and memory 404 to store data including the app having the engine 112. The processor 402 and memory 404 are hardware. The memory 404 includes non-transitory memory, e.g., random access memory (RAM) and one or more flash disks or hard drives. The non-transitory memory may include any tangible computer-readable medium including, for example, magnetic and/or optical disks, flash drives, and the like.

The mobile computing device 110 downloads and installs one or more apps having the engine 112. In one example, the one or more apps having the engine 112 are downloaded from the mobile repository computer system 114. The mobile computing device 110 executes the app having the engine 112. Each of the one or more engines 112 installed on the mobile computing device 110 includes a parser for parsing an XML ADL file and a runtime manager for running an app based on the parsed XML ADL file. The engine 112 parses and renders XML ADL files at runtime, enabling developers to test in realtime and push out live updates to apps having the engine 112 from the app development computer system 102 once the apps have been downloaded from the app repository computer system 114 rather than forcing end users to download app updates from the app repository computer system 114.

The mobile computing device 110 further includes a display 406, and an input device 408. The display 406 is used to display visual components of the engine 112, such as a user interface. The display 406 can include a cathode-ray tube display, a liquid-crystal display, a light-emitting diode display, a touch screen display, and other displays. The input device 408 is used to interact with the apps 112 and may include a mouse, a keyboard, a trackpad, and/or the like. The input device 408 may be included within the display 406 if the display is a touch screen display.

In one embodiment, the app with the engine 112 may be a test app for testing other app projects and for downloading and interacting with app projects created using the app development environment 104.

The developer computer 106 may be connected to one of the mobile computing devices 110. The developer computer 106 may be connected to the mobile computing device 110 via a wireless or wired connection. This mobile computing device 110 may include the test app for testing other apps and may include features used for testing the apps including debugging tools, instrument tools, and other development tools. A developer uses the developer computer 106 to create an app with the engine 112 and may test the app with the engine 112 using the test app on the mobile computing device 110.

Figure 5:
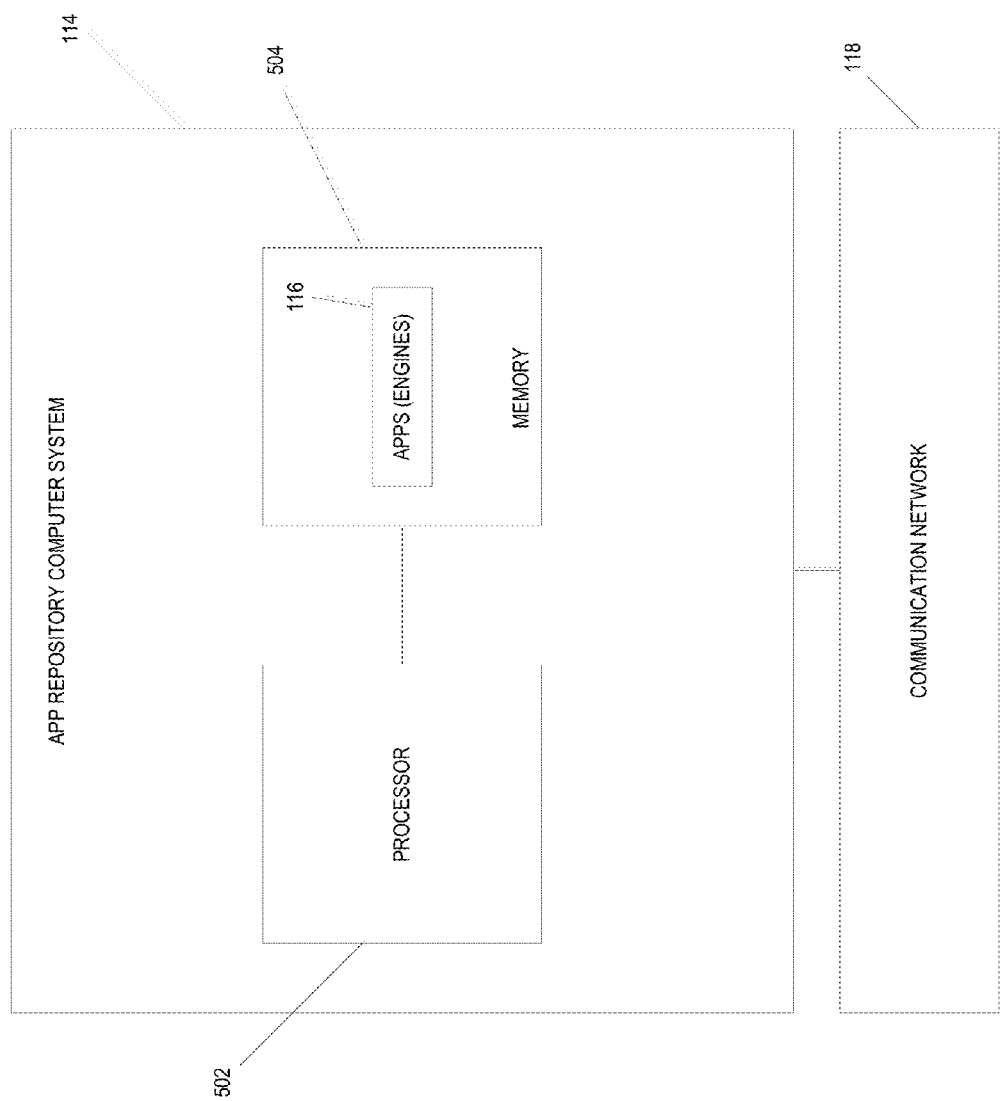
FIG. 5 illustrates a block diagram of an app repository computer system according to an example embodiment.

FIG. 5 illustrates a block diagram of the app repository computer system 114 according to an example embodiment. According to an aspect of the present disclosure, the app repository computer system 114 is a computer having a processor and memory including but not limited to a laptop, desktop, tablet computer, mobile computing device (e.g., a smart phone) or a dedicated electronic device having a processor and memory. In one exemplary embodiment, the app repository computer system 114 is a server in a datacenter.

The app repository computer system 114 includes one or more processors 502 to process data and memory 504 to store data including one or more apps 116 having an included engine. The processor 502 and memory 504 are hardware. The memory 504 includes non-transitory memory, e.g., random access memory (RAM) and one or more flash disks or hard drives. The non-transitory memory may include any tangible computer-readable medium including, for example, magnetic and/or optical disks, flash drives, and the like. The data associated with the apps 116 may be stored in a structured query language (SQL) server database or another appropriate database management system within memory 504. Additionally, the memory 504 may also include a dedicated file server having one or more dedicated processors, random access memory (RAM), a Redundant Array of Inexpensive Disks hard drive configuration, an Ethernet interface or other communication interface, and a server-based operating system.

The app repository computer system 114 receives a request for an app 116 having an engine from a mobile computing device 110 and transmits a copy of the app 116 to the mobile computing device 110. The mobile computing device 110 receives data associated with the copy of the app 116 and installs the app 116. After being downloaded and installed, the mobile computing device 110 executes the app 116.

Figure 6:
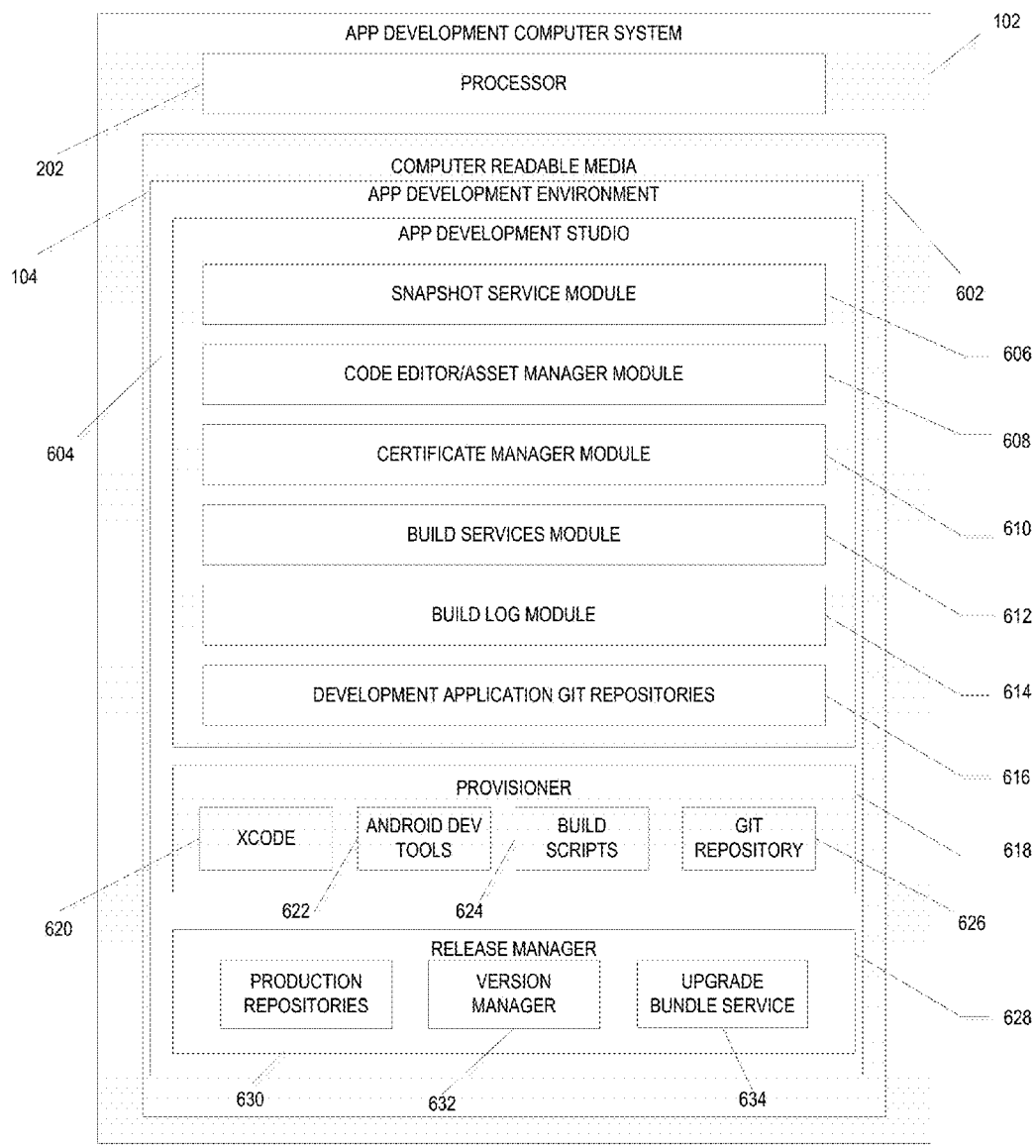
FIG. 6 is a block diagram of an app development environment of an app development computer system according to one embodiment of the present disclosure.

FIG. 6 illustrates a block diagram of the app development environment 104 according to an example embodiment. As noted above, the app development environment 104 is executed by the processor 202. The app development computer system 102 includes computer readable media 602 on which the app development environment 104 is stored. The computer readable media 602 may include volatile media, nonvolatile media, removable media, non-removable media, and/or another available medium that can be accessed by the processor 202. By way of example and not limitation, the computer readable media 602 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

The app development environment 104 of the app development computer system 102 communicates information including messages, data, and/or files to the web browser 108 of the development computer 106. As an example, the app development environment 104 is a web-based application having a user interface viewed using the web browser 108 on the development computer 106 and/or a native application executed by the development computer 106. The app development environment 104 receives messages, data, and/or files from the web browser 108 of the development computer 106 and transmits messages, data, and/or files to the web browser 108 of the development computer 106.

The app development environment 104 includes an app development studio 604 to create, edit, update, and delete individual app projects. The app development studio 604 allows a user to create, edit, update, and delete XML ADL code, upload app assets (e.g., images, audio, video, etc.), upload app icons and splash screen images, create app snapshots that include a commit of all code and app assets to a development GIT repository specifically for the app, and promote an app snapshot to a release to be stored in a production GIT repository and uploaded to a digital distribution platform provided by the app repository computer system 114.

A GIT repository is a content-addressable filesystem based on Git, a free and open source distributed revision control system and source code management (SCM) system. In one embodiment, the GIT repository may be a key-value data store that may store any content including a snapshot of an app including an engine, one or more XML ADL code files, and app related assets. When the snapshot is stored in the GIT repository, the GIT repository returns an output that is a key that may be used to retrieve the snapshot from the GIT repository. In one example, the key is a forty character checksum hash. This forty character checksum hash is also known as a commitID because it represents a key to a version of the app saved or committed to the development GIT repository. The commitId may be a forty character id or message digest that is represented in hexadecimal and generated by running a cryptographic hash function (e.g., secure hash algorithm 1 or SHA-1) on an arbitrary block of digital data, e.g., an app binary file or executable file.

The app development studio 604 includes a snapshot service module 606 for creating app snapshots and storing the app snapshots in a GIT repository in memory 204. The app development studio 604 further includes a code editor/asset manager module 608 for creating, editing, updating, and deleting XML ADL code and app assets. In one example, the code editor is a web-based text editor and the asset manager is a web-based file manager system for creating, editing, updating, and deleting app assets, e.g., images, videos, and music files. In one example, the web-based file manager system is a drag-and-drop type file manager. In another example, the web-based file manager system allows a user to select a file stored locally and upload the file to the app development studio. The app development studio 604 further includes a certificate manager module 610 for creating, editing, updating, and deleting app certificates, provisioning files, and application programming interface (API) keys. A provisioning file is digital file that uniquely ties a developer and device to an authorized development team for submitting an app to the app repository computer system 114 and enables a specific mobile computing device 110 for testing. The app development studio 604 includes a build services module 612 for packaging code and app assets associated with an app and transmitting the code and app assets to a provisioner, and a build log module 614 for logging any build console information when the provisioner builds a version of an app. The app development studio 604 includes development application GIT repositories 616 for storing each snapshot including XML ADL code files, and app assets associated with each snapshot for each app.

The app development environment 104 further includes a provisioner 618 to receive XML ADL code and app assets associated with an app project, build the app project, and provision a corresponding app having the engine 112. In an example embodiment, the provisioner 618 is executed by the processor 202. The provisioner 618 includes a copy of Xcode 620, Android Dev Tools 622, build scripts 624, and a GIT repository 626 for storing temporary copies of code and app assets associated with one or more apps to be built. In one case, a provisioning set of one or more servers having one or more processors and memory associated with the app development computer system 102 executes the provisioner 618. The provisioner 618 processes requests using round-robin scheduling, and one or more build requests are serviced simultaneously. During the build process, the provisioner 618 inserts a pre-compiled shared library comprising the engine into each app to be built and signs the app with one or more certificates or files that prove an identity of a developer. Once the app is signed by the provisioner 618, it may be uploaded to the app repository computer system 114.

The provisioner 618 builds the app using the build scripts 624 and transmits a built copy of the app including the engine 112 as an .ipa file and/or a .apk file to the app development studio 604. When an app is built using the build scripts 624, the app development environment 104 sends a build job in Javascript Object Notation (JSON) format to an appropriate messaging exchange and the messaging exchange distributes the job to a build queue. In one example, the messaging exchange is a RabbitMQ messaging exchange that uses the advanced messaging queuing protocol (AMQP). A listener on the provisioner 618 claims the job from the build queue and the listener executes a particular build script for an appropriate platform, e.g., an iOS build script or an Android build script. The build script creates a directory for the build based on the platform and the app project and engine are copied to the directory. Development certificates, provisioning files, icons, launch images, and other appropriate files are also copied to the directory. Templates are applied to data for the build job, and resulting files are placed in the build directory.

In one example, the templates are Smarty templates that generate specific manifest (e.g., Android) and/or info.plist (iOS) files. Smarty is a web template system, e.g., a template language written in PHP (Hypertext Preprocessor). PHP is a server-side scripting language for web development and also may serve as a general-purpose programming language. PHP code is typically interpreted by a server with a PHP processor module, e.g., the processor 202. The Smarty template generates web content through placement of special Smarty tags within a document. In other words, the Smarty template is applied to the data for the build job, and the resulting files are placed in the build directory.

Development certificates and provisioning files are inserted into a keychain of the provisioner 618. The build of the app, including any necessary signing, is executed by a bash script. The built file, e.g., an .ipa file or an .apk file, is transmitted to a remote location, e.g., the app development computer system 102. The build output is parsed, a status is determined (success/failure), and passed back to the listener. The listener publishes a final job status to the messaging exchange and then waits for another job.

The development studio 104 may transmit a copy of the .ipa file and/or the .apk file to the developer computer 106. Using the web browser 108, a developer may download the copy of the .ipa file and/or the .apk file and transmit the copy of the .ipa file and/or the .apk file to the app repository computer system 114. In one example, the developer uploads the .ipa file to iTunes Connect for review and for sale by the app repository computer system 114. In another example, the developer uploads the .apk file to Google play for review and sale by the app repository computer system 114. Sale may mean that the app is distributed by the app repository computer system 114 for free and/or for payment.

After the app with the engine 112 has been uploaded to the app repository computer system 114 (and optionally approved by the provider of the app repository computer system 114 through an app review process), the app with the engine 112 may be updated by updating the XML ADL code file without submitting an updated copy of the app to the app repository computer system 114. A user of the developer computer 106 using the app development environment 104 may make any changes to the XML ADL code files and/or app related assets associated with the app with the engine 112 and create a new development snapshot that is stored in the development application GIT repositories 616. The user may promote any development snapshot of the app with the engine 112 to a release.

In addition to the app development studio 604 and the provisioner 618, the app development environment 104 includes a release manager 628. In one embodiment, the release manager 628 includes production application GIT repositories 630, a version manager 632, and an upgrade bundle service 634.

The production application GIT repositories 630 store copies of XML ADL code and app assets associated with versions of the apps with the engine 112 that have been uploaded to the app repository computer system 114 and subsequent updates to the apps with the engine 112, e.g, development snapshots of the app with the engine 112 promoted to a release.

According to an example embodiment, the app with the engine 112 may be updated without uploading a new version of the app to the app repository computer system 114. The developer may make changes to the XML ADL code files and/or other assets of the app with the engine 112 and these changes will be pushed to mobile computing devices 110 having the app with the engine 112.

However, in certain instances, the engine 112 may have to be updated because it is incompatible. For instance, an operating system of the mobile computing device 110 may be updated and this may require that the app with the engine 112 be updated to take advantage of new application programming interfaces (APIs) or because other APIs have been deprecated. The version manager 632 sends a message to the mobile computing device 110, the message indicating that the mobile computing device 110 has an incompatible version of the engine that is not the latest version and that a compatible newer version of the engine is available for download with a newer version of the app from the app repository computer system 114.

The version manager 632 receives a request from the app with the engine 112 to determine whether a version of the app with the engine 112 on the mobile computing device 110 is a latest version of the app with the engine 112. The request includes a commitId and/or a version number of the app with the engine 112.

In one example, the initial version of the app with the engine 112 stored with the app repository computer system 114 including the original version of the XML ADL code files of the app with the engine 112 may be version 1.0 and have a commitId of 1A. If the XML ADL code file is updated and the development snapshot of the engine 112 is promoted to a release, the app with the engine 112 would be version 1.0 with a new commitID of 1 B. If a new version of the app with the engine 112 is uploaded to the app repository computer system 114, the version is now 2.0 and the commitId may be 2A. If the XML ADL code file of the new version of the app with the engine is updated, the version is 2.0 and a new commitId may be 2B.

If the version manager 632 determines that a mobile computing device 110 has a version of the app with the engine 112 that is not the latest version, e.g, 1.0 instead of 2.0 or 1.0 instead of 1.1, the version manager 632 determines that the version of the app with the engine on the mobile computing device is incompatible and transmits a message to the mobile computing device 110 indicating that a new version of the app with the engine should be downloaded from the app repository computer system 114. This means that the version number of the app with the engine 112 was not used to produce the commitId and indicates that an engine of the version of the app on the mobile computing device 110 is incompatible with the newest version of the app and that a newer engine compatible with the newest version of the app is available for download from the app repository computer system 114. In one example, the message may be an alert dialog displayed on the mobile computing device 110 with one or more options associated with downloading a newest version of the app from the app repository computer system 114. If allowed by a user of the mobile computing device, the mobile computing device 110 sends a request to the app repository computer system 114 to download an updated version of the app with the engine 112.

The upgrade bundle service 634 determines differences between the version of the app with the engine 112 having a latest version, but an older commitId, and the latest version of the app with the engine 112 with the newest commitId stored in the production repositories 630. The upgrade bundle service 634 checks out app resources of the latest version of the app with the engine 112 from the production repositories 630 that have changed and stores data associated with the differences in a file. In one example, the file may be an archive file, e.g., a zip file. The upgrade bundle service 634 transmits the file with the differences to the mobile computing device 110. The mobile computing device 110 receives the file with the differences, the engine 112 extracts the file with the differences, updates the app with the engine 112 to the latest version, and updates an internal commitId to match the commitId of the latest version of the app with the engine 112.

Figure 7:
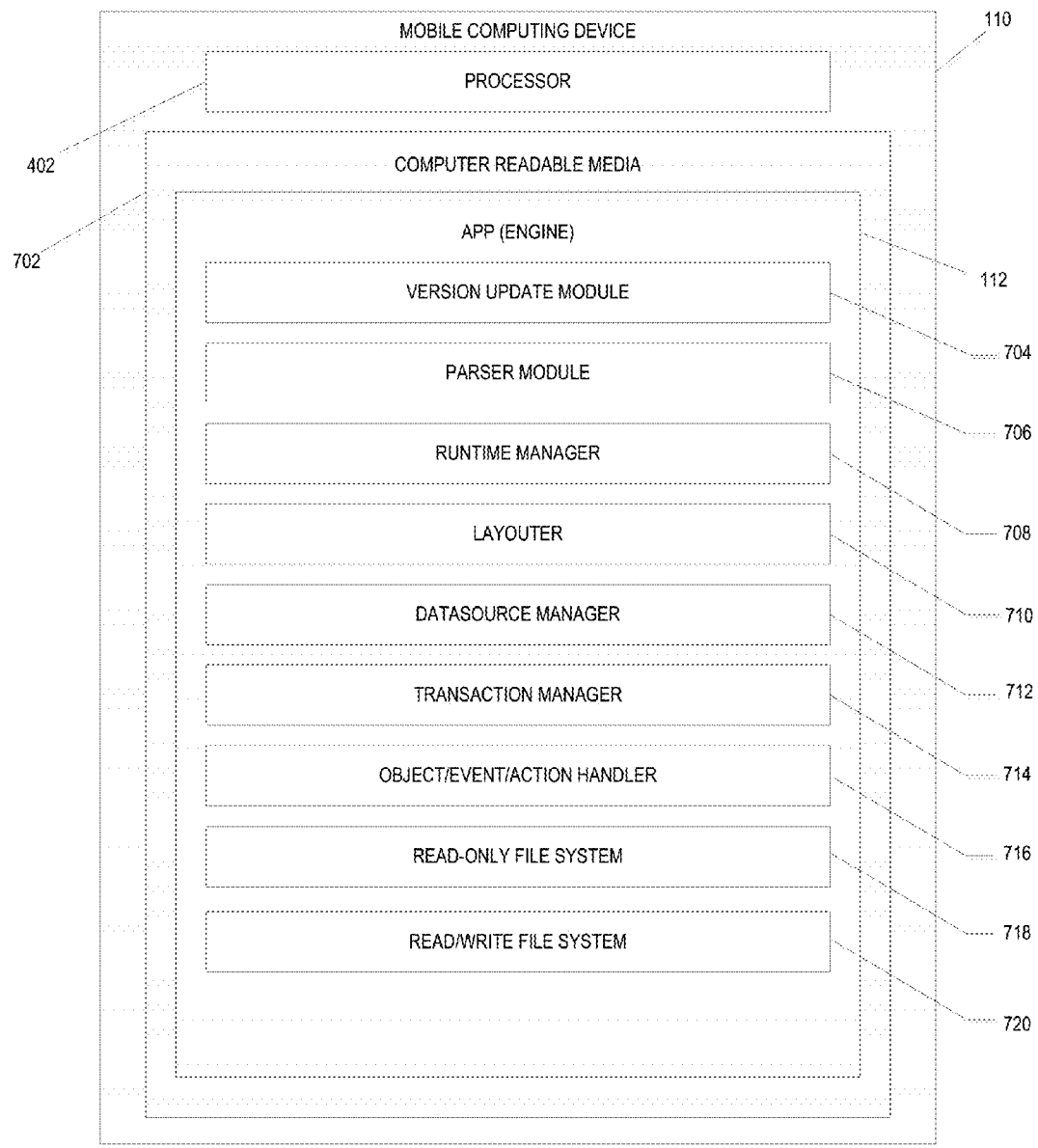
FIG. 7 illustrates a block diagram of an app having an engine according to an example embodiment.

FIG. 7 illustrates a block diagram of the app with the engine 112 according to an example embodiment. As noted above, the app with the engine 112 is executed by the processor 402. The mobile computing device 110 includes computer readable media 702 on which the app with the engine 112 is stored. The computer readable media 702 may include volatile media, nonvolatile media, removable media, non-removable media, and/or another available medium that can be accessed by the processor 402. By way of example and not limitation, the computer readable media 702 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

As an example, the app with the engine 112 is executed by the mobile computing device 110 and displayed on the display 406. A user interacts with the app with the engine 112 using the input device 408. The app with the engine 112 receives messages and data from the release manager 628 of the app development environment 104 of the app development computing system 102 and transmits messages and data to the release manager 628 of the app development environment 104 of the app development computing system 102.

When initially downloaded from the app repository computer system 114 and installed, the app having the engine 112 is stored in a read-only file system 718. According to an example embodiment, the mobile computing device 110 launches the app having the engine 112. The engine 112 first determines whether the app has been updated since being uploaded to the app repository computer system 114. If the app has not been updated, the engine 112 retrieves the version number and the commitId from the app repository computer system version in the read only file system 718. If the app has updated XML ADL code and/or other assets, the engine 112 retrieves the version number and the commitId from a last update. The updated XML ADL code and/or other assets are stored in a read/write file system 720 along with the version number and commitId from the last update.

The engine 112 includes a version update module 704 to determine whether a version of the app having the engine 112 on the mobile computing device 110 is a latest version of the app having the engine 112. In one example, the app with the engine may be version 1.0 and have a commitId of 1A. The original version of the app with the engine 112 submitted to the app repository computer system 114 includes one or more original XML ADL files along with other assets associated with the app. As noted herein, the original version of the app having the engine 112 submitted to the app repository computer system 114 is stored in the read only file system 718 in memory 404. When the app with the engine 112 is first launched by the mobile computing device 110, the engine 112 creates the read/write file system 720.

In another example, if the app with the engine 112 includes updated XML ADL code or other assets, the engine 112 retrieves the commitId from a last update. In one example, the app with the engine may be version 1.0 and have a commitId of 1B. The updated XML ADL code or other assets are stored in the read/write file system 720 in memory 404.

The version update module 704 transmits a message including a commitId and the version number of the app with the engine 112 on the mobile computing device 110 to the version manager 632 of the release manager 628 of the app development environment 104. The version manager 632 determines a latest version number and commitId of the app with the engine 112 stored in the production repositories 630. The version manager 632 compares the version number and the commitId of the version of the app with of the engine 112 on the mobile computing device 110 with the latest release version number and commitId of the app with the engine 112.

If the version number of the app with the engine 112 on the computing device 110 is older than a version number of the app with the engine 112 stored in the production repositories 630 and submitted to the app repository computer system 114, an update of the app with the engine is not allowed. For instance, the latest version of the app with the engine 112 uploaded as an app to the app repository computer system 114 may be version 2.0 with a commitId of 2A, but the version and commitId of the version of the app with the engine 112 on the mobile computing device 110 may be 1.0 and 1C. In other words, the developer has uploaded a newer version of the engine 112 with an app to the app repository computer system 114 and the mobile computing device 110 will need to download an updated version of the app with the newer version of the engine 112 available from the app repository computer system 114 and install the app with the newer version of the engine 112 to the read only file system 718.

If the version manager 632 determines that the app with the engine 112 includes a newest version number of the app with the engine but the commitId from the app with the engine is older than the latest release commitId in the production repositories 630, then this means that XML ADL code and/or app assets have been updated, and an update is determined to be necessary. The version manager 632 sends a message to the upgrade bundle service 634 to determine the app resources that have changed between the latest release commitId and the commitId of the app with the engine 112 on the mobile computing device 110.

The upgrade bundle service 634 performs a diff, or determines the differences between the latest version of the app with the engine 112 stored in the product repositories 630 and the version of the app with the engine 112 on the mobile computing device 110. The app resources that have changed are saved in a file. In one example, the file may be a zip archive. The upgrade bundle service 634 of the release manager transmits a copy of the file with the app resources that have changed and the new release commitId of the app with the engine 112 to the mobile computing device 110. The engine 112 receives the file with the app resources that have changed and the new release commitId of the engine 112 and extracts the app resources in the file to the read/write file system 720 in memory 404 of the mobile computing device 110. The engine 112 updates the old commitId to the new release commitId.

Additionally, the engine 112 includes a parser module 706 for parsing XML ADL code. According to an example embodiment, the parser module 706 parses the XML ADL code using SAX (Simple API for XML) parsing. SAX is an event-based sequential access parser API that provides a mechanism for reading data from an XML document, e.g., the XML ADL code. While the Document Object Model (DOM) also reads XML files, DOM operates on an XML document as a whole, while SAX parsers such as the parser module 706 parse each piece of the XML document sequentially.

After the version update module 704 determines that the app with the engine 112 is the latest version of the app with the engine 112, the parser module 706 of the engine 112 parses the ADL XML file and runs the engine 112. The engine 112 further includes a runtime manager 708 for running the app with the engine 112 as a native app on the mobile computing device 110, a layouter 710 for converting the parsed ADL XML code into native interface components and a datasource manager 712 for converting the parsed ADL XML code into internal and external datasources for the native app on the mobile computing device 110.

The layouter 710 converts the parsed XML ADL code into user interface views including tableviews, scrollviews, containerviews, web views, dropdown menus including pickers, buttons, maps, and other user interface components.

The datasource manager 712 provides access to datasources available locally on the mobile computing device 110 and externally on other computing devices. The datasource manager 712 allows creating, editing, updating, and deleting data locally and externally. The datasources may include web services, e.g., representational state transfer (REST) web services, rich site summary or really simple syndication (RSS) web services, and SOAP (originally simple object access protocol) web services, among others. The web services may include Facebook, Twitter, Flurry, SalesForce, and others. Additionally, the datasources may include a camera datasource provided by camera hardware of the mobile computing device 110. The camera datasource may be used to capture photographs and video with and/or without audio using the camera hardware and save the captured photographs and video with and/or without audio locally and externally. There may be one or more camera datasource types including a photo type, a barcode scan type, and a video type. The datasources may include a GPS datasource provided by global positioning system (GPS) hardware of the mobile computing device 110, a user contacts datasource provided by the mobile computing device 110, a user calendar/events datasource provided by the mobile computing device 110, databases stored locally and externally by the mobile computing device 110, and user preferences provided by the mobile computing device 110. The engine may communicate with the app repository computing system 114 to process in-app purchases. As an example, the in-app purchases may unlock new functionality, or may download other standalone XML files for execution by the app.

The engine 112 further includes a transaction manager 714 for converting the parsed XML ADL code into in-app purchase transactions and other transactions, and an object/event/action handler 716 for converting parsed ADL XML code into native objects, native events, and native actions. In one example, the layouter 710, the datasource manager 712, the transaction manager 714, and the object/event/action handler 716 construct native objects and data structures at runtime based on the parsed XML ADL.

Figure 8:
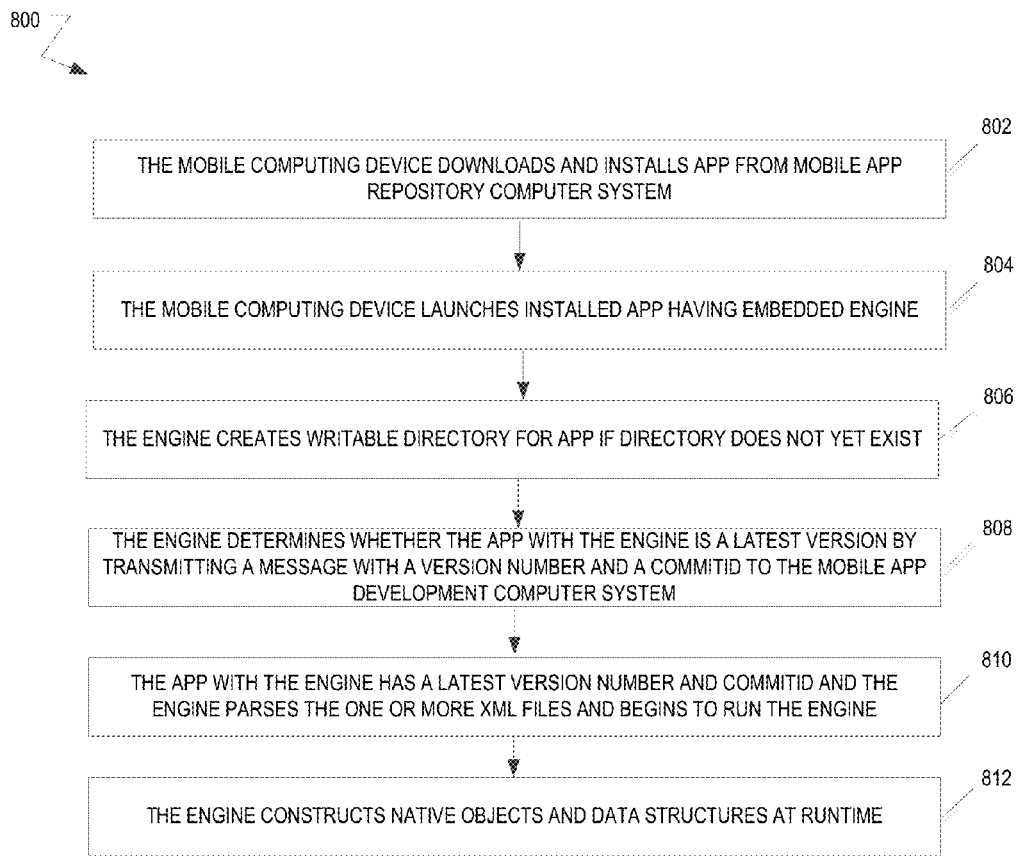
FIG. 8 shows a flowchart of a process for downloading and installing an app having an embedded engine on a mobile computing device according to an example embodiment.

FIG. 8 illustrates a flowchart of a process 800 for downloading and installing an app having an embedded engine 112 on a mobile device according to an example embodiment. The process 800 shown in FIG. 8 begins in step 802. In step 802, the mobile computing device 110 transmits a request to the mobile app repository computer system 114 for a particular app having an engine 116. The mobile app repository computer system 114 transmits a copy of one of the apps with an engine 116 to the mobile computing device 110 in response to the request. The mobile computing device 110 receives the data associated with the particular requested app and downloads and installs the app in memory 404.

In step 804, after the app is installed, the mobile computing device 110 launches the app. According to an example embodiment, the app includes an embedded engine. In step 806, the engine determines whether a writable directory exists for the app. If a writable directory for the app has not yet been created, then the engine creates a writable directory for the app. In step 808, the engine determines whether the app with the engine 112 is a latest version by transmitting a message with a version number and a commitID to the mobile app development computer system 102.

In step 810, if the app with the engine has a latest version number and commitId, the engine parses one or more XML ADL files and begins an engine runtime. In step 812, the engine constructs a layout of the app and interface components and displays the layout and the interface components on the display of the mobile computing device 110. In addition, the engine constructs one or more datasources available on the mobile computing device 110 and external datasources available on external computing devices. The datasources may include web services (e.g., REST web services, RSS web services, SOAP web services, etc.), a camera datasource provided by the mobile computing device 110, a GPS datasource provided by the mobile computing device 110, a user contacts datasource provided by the mobile computing device 110, a user calendar/events datasource provided by the mobile computing device 110, databases provided by the mobile computing device 110, and user preferences provided by the mobile computing device 110. The engine may communicate with the app repository computing system 114 to process in-app purchases. As an example, the in-app purchases may unlock new functionality, or may download other standalone XML files for execution by the app.

Figure 9:
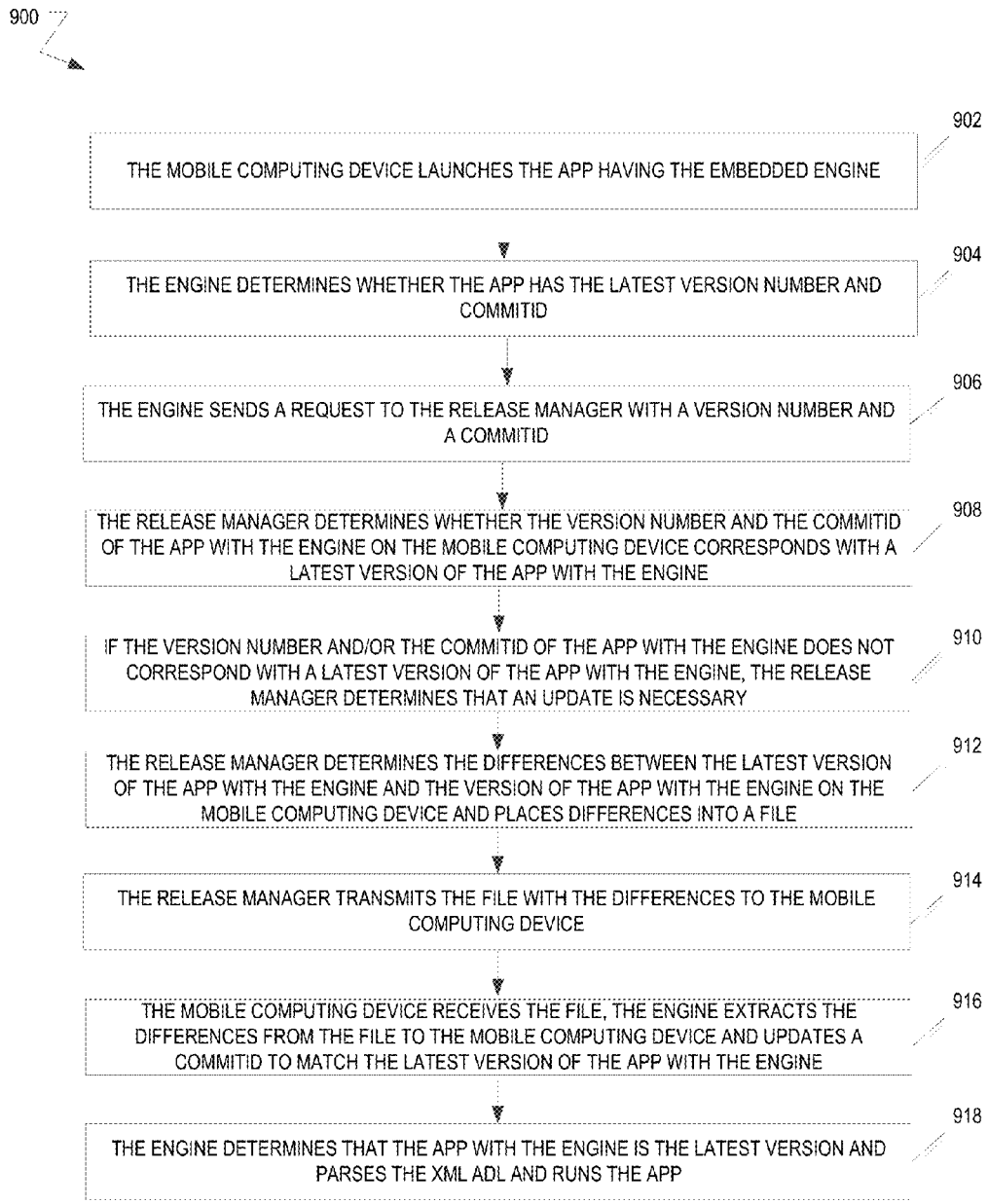
FIG. 9 illustrates a flowchart of a process for updating an app having an embedded engine installed on a mobile computing device according to an example embodiment.

FIG. 9 illustrates a flowchart of a process 900 for updating an app with an engine 112 installed on the mobile computing device 110 according to an example embodiment. The process 900 shown in FIG. 9 begins in step 902. In step 902, the mobile computing device 110 launches the app having the engine 112. In step 904, the engine 112 determines whether the app with the engine 112 has a latest version number and commitId. If the app with the engine 112 has not yet been updated since being installed on the mobile computing device, the app may be version 1.0 with a commitId of 1A. If the app with the engine 112 has been updated since being installed on the mobile computing device, the app with the engine may be version 1.0 with a commitId of 1B.

In step 906, the engine sends a request to the release manager 628 of the app development computer system 102 with a version number and a commitId of the app with the engine 112. In step 908, the release manager 628 determines whether the version number and the commitId of the app with the engine on the mobile computing device 110 corresponds with a latest version of the app with the engine in the production repositories 630. In step 910, if the version number and/or the commitId of the app with the engine 112 does not correspond with a latest version and/or commitId of the app with the engine, the release manager 628 determines that an update is necessary. In one example, the version number and the commitId of the app with the engine on the computing device may be 1.0 and 1A. As an example, the latest version of the app with the engine may have a version number of 1.0 and a commitId of 1C. As another example, the latest version of the app with the engine 112 may be version 2.0 with a commitId of 2A. In other words, the developer has uploaded a newer version of the engine with an app to the app repository computer system 114 and the mobile computing device 110 will need to download an updated version of the app available from the app repository computer system 114 and install the updated version of the app to the read only file system 718.

Once the mobile computing device 110 has a correct version of the app but an older commitId, in step 912, the release manager 628 determines the differences between the latest version of app with the engine with a newer commitId and the version of the app with the engine on the mobile computing device 110 with an older commitId and inserts data associated with the differences into a file. The release manager 628 may compress the file. In step 914, the release manager 628 transmits the file with the differences to the mobile computing device 110. In step 916, the mobile computing device 110 receives the file and the engine 112 extracts the differences from the file to the mobile computing device 110. The engine 112 updates the app using the differences and updates the commitID to match the latest version of the app with the engine 112. In step 918, the engine 112 determines that the app with the engine is the latest version of the app with the engine, parses the XML ADL, and runs the app.

Figure 10:
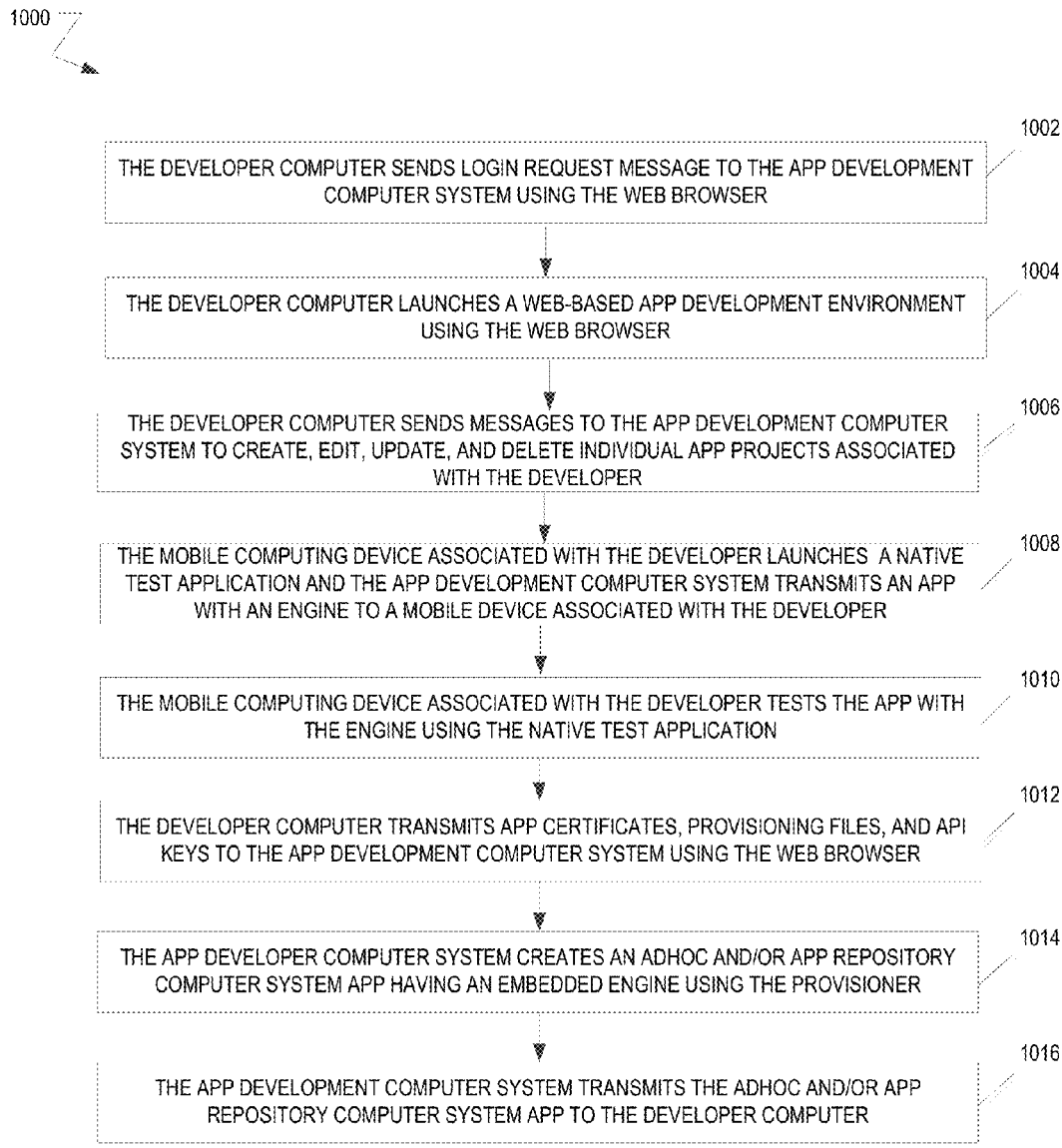
FIG. 10 illustrates a flowchart of a process for creating an app having an embedded engine using a developer computer and an app development environment according to an example embodiment.

FIG. 10 illustrates a flowchart of a process 1000 for creating an app having an engine 112 using the developer computer 106 according to an example embodiment. The process 1000 shown in FIG. 10 begins in step 1002. In step 1002, the developer computer 106 sends a login request message to the app development environment 104 of the app development computer system 102 using the web browser 108. The app development environment 104 of the app developer computer system 102 queries the database of user information in memory 204 to confirm that the user information provided with the login request message is correct. If the developer has a user account and the user information provided with the login request message is correct, the app development environment 104 transmits data and/or a web page to the web browser 108.

In step 1004, the developer computer 106 receives the data and/or the web page and displays a web-based app development environment using the web browser 108. In step 1006, the developer computer 106 transmits messages and/or data to the app development environment 104 of the app development computer system 102 to create, edit, update, and delete individual app projects and store snapshots of the app projects as an app with an engine 112 in the development application GIT repositories 616 associated with the user account.

In step 1008, when the user is ready to test an app having an engine 112 on a mobile computing device 110, the developer may launch a test application, which is also an app having an engine 116 downloaded from the app repository computer system 114. The test application sends a login request message to the app development environment 104 of the app development computer system 102. The app development environment 104 of the app development computer system 102 queries the database of user information to confirm that the user information provided with the login request message is correct. If the developer has a user account and the user information provided with the login request message is correct, the app development environment 104 transmits data associated with one or more apps having an engine 112 of the user account. If a copy of the app having the engine 112 is not available on the mobile computing device 110, the mobile computing device transmits a request for the app having the engine to the app development computer system 102. The app development computer system 102 receives the request and transmits a copy of the latest version of the app having the engine to the mobile computing device 110.

In step 1010, the mobile computing device 110 launches the app having the engine and may test the app on the mobile computing device 110. Any changes to the app with the engine may be made using the app development environment 104 and may be transmitted to the mobile computing device 110 without recompiling the app. Similar to the description herein, the app with the engine 112 and/or the test application determines whether the version on the mobile computing device 110 is a latest version of the app with the engine before running.

In step 1012, the developer computer 106 transmits app certificates, provisioning files, application programming interface (API) information, and other information to the app development environment 104 of the app development computer system 102 using the web browser 108. In step 1014, the app development computer system 102 creates an adhoc and/or an app repository computer system version of the app having an embedded engine using the provisioner 618. The provisioner 618 uses the app certificates, provisioning files, and API information to create the adhoc and/or the app repository computer system version of the app. In step 1016, the app development computer system 102 transmits a copy of the adhoc and/or the app repository computer system version of the app with the engine to the developer computer 106. The developer may distribute the copy of the adhoc and/or the app repository computer system version of the app to the app repository computer system 114.

After the app with the engine 112 has been uploaded to the app repository computer system 114, the app having the engine may be updated. The user may promote any development snapshot of the app having the engine 112 to a release. When a development snapshot is promoted to a release, this creates a clone of the snapshot in the production GIT repository, and updates a commitId of a latest version of the app with the engine 112. Thus, when the app with the engine 112 is launched on the mobile computing device 110, the version update module 704 will determine whether the current version and commitId of the app with the engine on the mobile computing device 110 is a latest version and commitID of the app with the engine 112 available to mobile computing devices 110.

Figure 11:
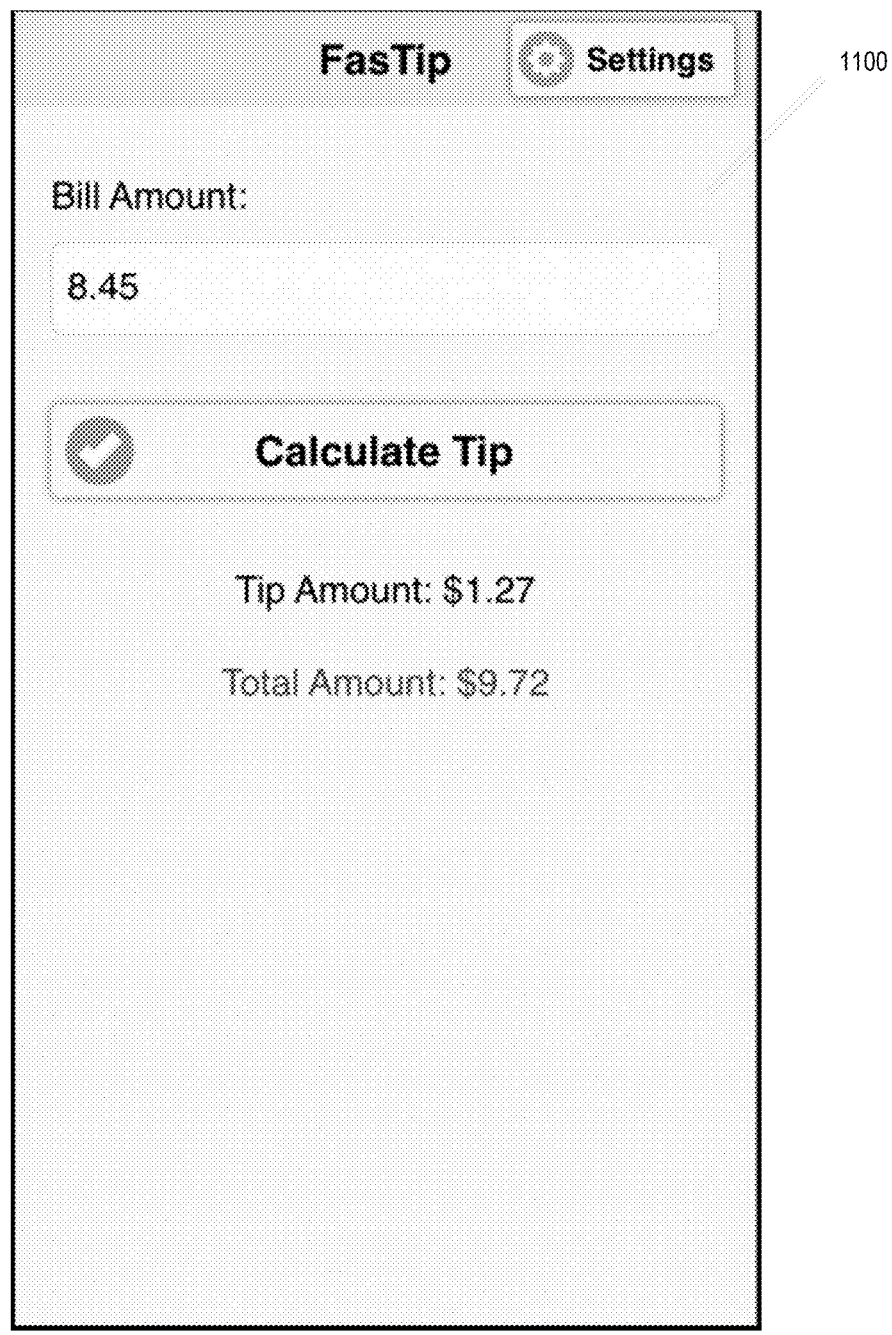
FIG. 11 illustrates an example screenshot of an app having an embedded engine executed by a mobile computing device according to an example embodiment.

FIG. 11 illustrates an example screenshot 1100 of an app having an embedded engine 112 executed by the mobile computing device 110 according to an example embodiment. According to an example embodiment, the app having the embedded engine 112 executed by the mobile computing device 110 is written using the XML-based app description language (ADL). The XML-based app description language (ADL) may be WIRE or an equivalent language. In one example, WIRE code includes five main sections including <main>, <actions>, <datasources>, <classes>, and <styles>.

The screenshot 1100 shown in FIG. 11 is provided by an app FasTip that only includes <main> and <actions> WIRE code. Visual information is found in the <main> block of the WIRE code. The <main> block of the WIRE code includes text, panels, scrollable pages, images, and other view elements. The <action> block of the WIRE code includes actions for the app to execute on launch and at user request. The WIRE code for the FasTip app is shown in Appendix A.

As shown in FIG. 11, FasTip is an app with the engine 112 for calculating a tip amount based on a bill amount. In one example, the bill amount may be $8.45. As shown in FIG. 11, when a user selects the calculate tip button, the app determines a tip amount based on a tip percentage and displays the tip amount and the total amount. In this case, if the bill amount is $8.45, the tip amount is $1.27 and the total amount of the bill including the tip is $9.72.

Figure 12:
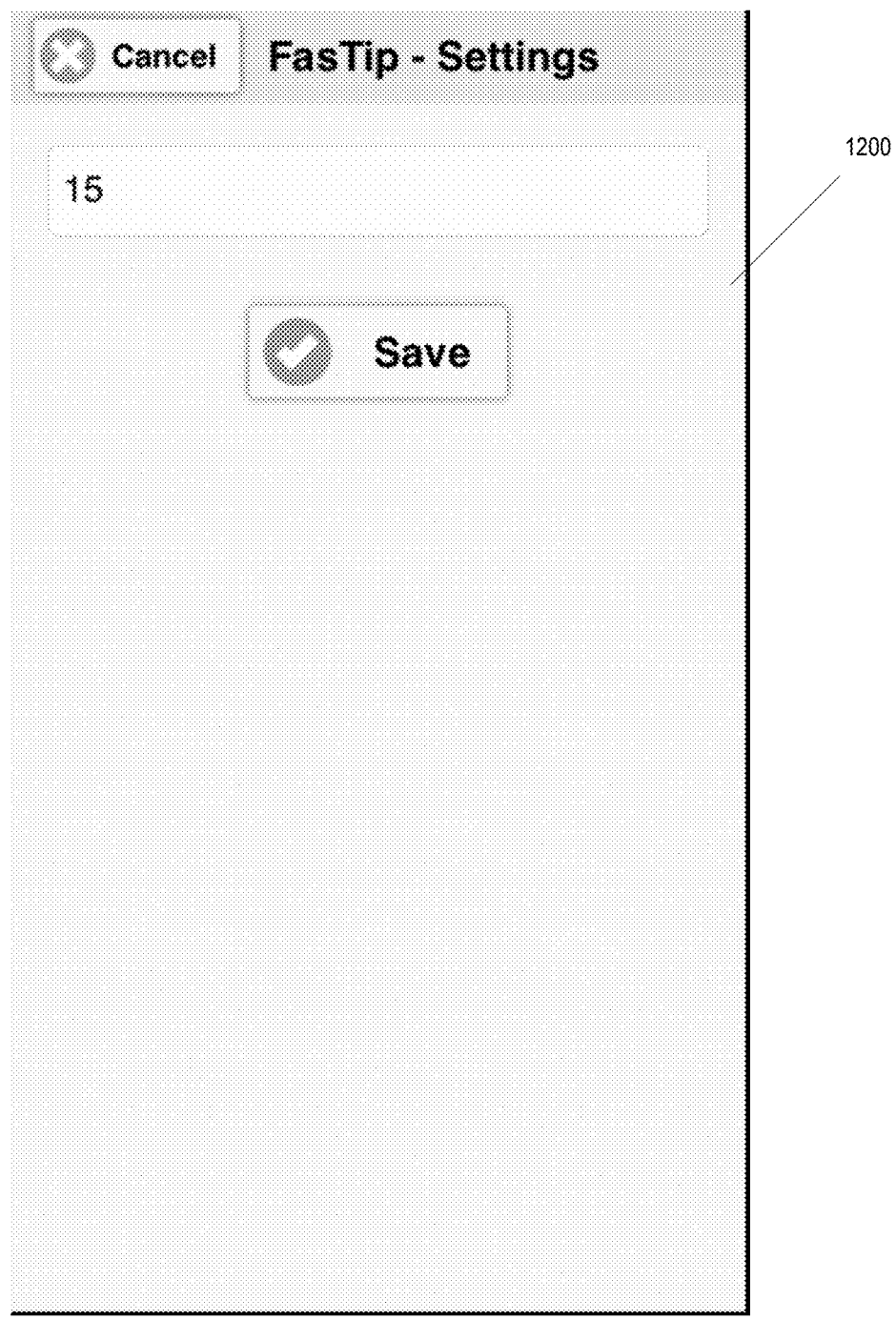
FIG. 12 illustrates another example screenshot of an app having an embedded engine executed by a mobile computing device according to an example embodiment.

FIG. 12 illustrates another example screenshot 1200 of the FasTip app having the embedded engine 112 executed by the mobile computing device 110 according to an example embodiment. FIG. 12 shows a settings user interface for setting a tip percentage for the FasTip app. A user may enter a tip amount, e.g., 15, which represents 15% and select the save button. This tip amount is then used by the FasTip app to determine a tip amount and a total amount for a bill.

WIRE code for a first camera capture app having the engine 112 for capturing a photograph and using a flash of the camera hardware of the mobile computing device 110 is shown in Appendix B. WIRE code for a second camera capture app having the engine 112 for capturing a photograph, storing the photograph in memory of the mobile computing device 110, and sending the photograph via email or tweeting the photograph is shown in Appendix C. WIRE code for an app having the engine 112 for displaying a map with pins showing predefined locations of recent earthquakes that have occurred around the world is shown in Appendix D.

Figure 13:
FIG. 13 illustrates a screenshot of an app for testing apps having an engine created using an app development computer system and executed by a mobile computing device according to an example embodiment.

FIG. 13 illustrates a screenshot 1300 of an app with an engine for testing apps created using the app development computer system 102 and executed by the mobile computing device 110 according to an example embodiment. FIG. 13 shows an example user interface of the app for testing apps created using the app development environment 104.

In this example, the developer has created five different apps with engines entitled "Spark," "fastip," "maptest," "tester," and "rsstest." When a user selects an update button 1302, the test app determines whether a newer version of each of the apps associated with the developer is available. Here, the user interface displays five buttons 1304 in a tableview, each button 1304 corresponding to one of the five different apps. Each of the buttons shows a text title 1308 of the app and a visual icon 1310 representing the app. The user interface shows visual indicators that indicate whether each of the five different apps have been downloaded to the mobile computing device 110. An arrow visual indicator shows that a newest version of an app has been downloaded to the mobile computing device and is ready for testing. A cloud visual indicator 1306 shows that a newest version of an app has not yet been downloaded to the mobile computing device but that a copy is available for download at the app development computer system 102.

When a user selects the top button 1304 associated with "Spark," the test app launches a copy of the "Spark" app. The engine associated with the "Spark" app displays a user interface of "Spark" on the mobile computing device 110. When a user selects the cloud button 1306 associated with "fastip," the test app downloads a copy of "fastip." Once the "fastip" app is downloaded, the test app no longer displays the cloud button 1306 and only displays an arrow visual indicator indicating that a newest version of "fastip" has been downloaded to the mobile computing device 110 and is ready for testing.

Figure 14:
FIG. 14 illustrates a screenshot of an app development environment of an app development computer system according to an example embodiment.

FIG. 14 illustrates a screenshot 1400 of the mobile application development environment 104 of the app development computer system 102 according to an example embodiment. The app development computer system 102 may transmit data and information to the developer computer 106 associated with the mobile application development environment 104. A user interface of the mobile application development environment 104 may be rendered by the web browser 108 of the developer computer 108 on the display 306. As shown in FIG. 14, the user interface of the mobile application development environment 104 may include a toolbar 1402 including one or more buttons. In this example, the toolbar 1402 includes a "Settings" button, a "Frame" button, a "Provisioning" button, a "Resources" button, and a "Help" button.

The "Settings" button provides platform settings, cache settings, software development kit (SDK) settings, and studio preferences. The "Frame" button provides a web-based interface to layout an app user interface visually rather than programmatically. The "Provisioning" button provides a certificate manager for uploading information associated with provisioning apps including iOS provisioning information comprising an app bundle ID, a distribution certificate, a distribution provisioning profile for app repository computer system distribution, an adhoc distribution provisioning profile, and Android provisioning information comprising a package name, public key information, a key alias, and private key information. The "Resources" button provides file transfer protocol (FTP) access information, hotkeys information, and a way to invite collaborators. The "Help" button provides FAQ information associated with the mobile application development system 100, XML ADL documentation, and access to forums to discuss and collaborate with other developers using the mobile application development system 100.

When a user selects one of these buttons using the input device 308, the web browser 108 will transmit a request to the app development environment 104, and the app development environment 104 will respond to the request by transmitting data and/or information associated with the selected button.

Additionally, the user interface of the mobile application development environment 104 includes a file manager 1404 having a list of files associated with a currently selected app having an engine 112, and a plurality of buttons for creating, editing, updating, and deleting files associated with the app having the engine 112. In this case, the user selected the "main.wire" shown in the file manager 1404. The mobile application development environment 104 displays WIRE code associated with the app having the engine in the text editor 1406. The user may create, edit, update, and delete WIRE code in the "main.wire" file using the input device 308 and save any changes by selecting a "Save File" button shown in FIG. 14. As noted above, example WIRE code is shown in Appendices A-D.

Figure 15:
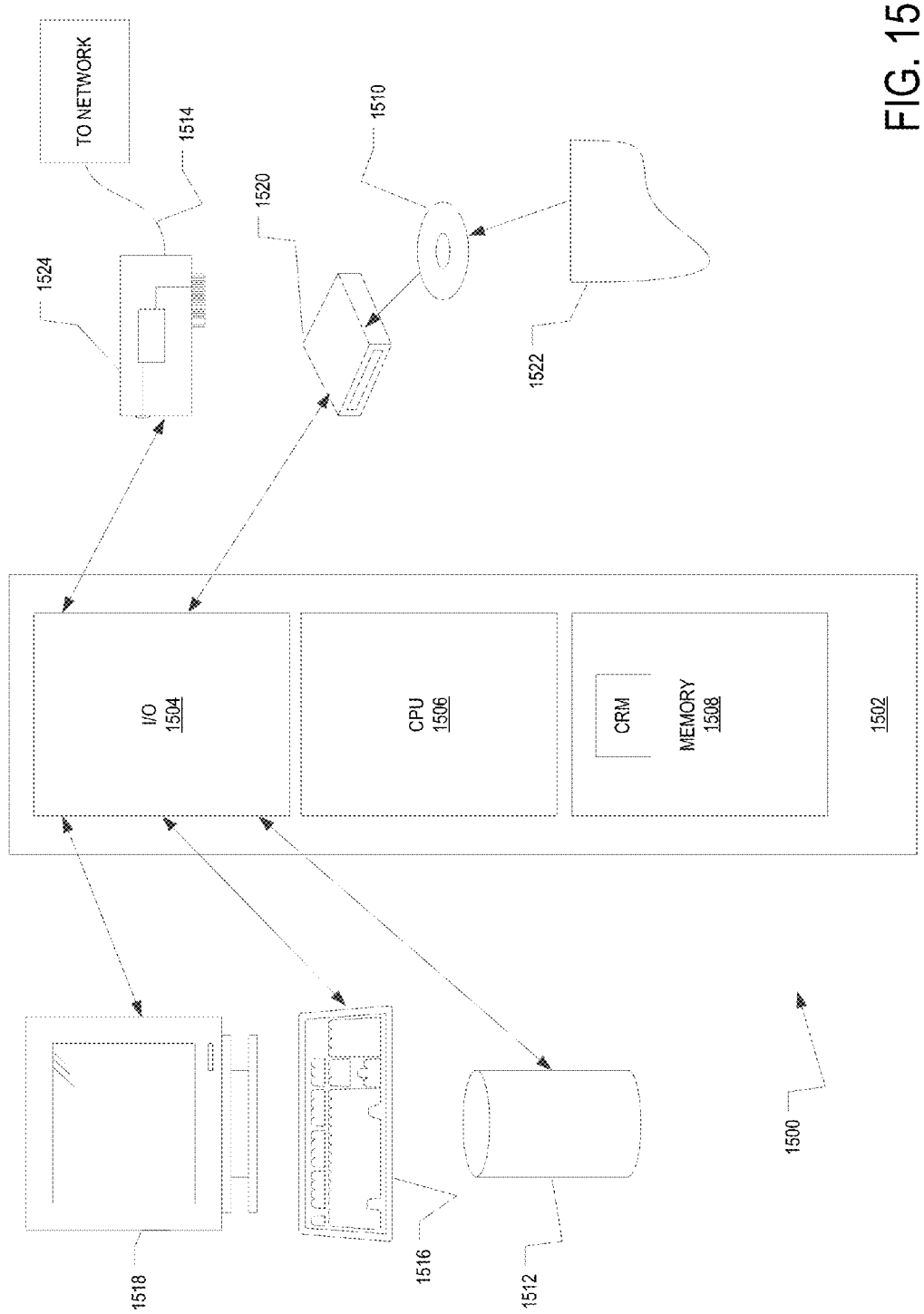
FIG. 15 illustrates a block diagram of an example computer device for use with the example embodiments.

FIG. 15 illustrates an example computing system 1500 that may implement various systems, such as the app development computer system 102, the developer computer 106, the mobile computing device 110, and the app repository computer system 114, and methods discussed herein, such as processes 800, 900, and 1000. A general purpose computer system 1500 is capable of executing a computer program product to execute a computer process. Data and program files may be input to the computer system 1500, which reads the files and executes the programs therein such as the app development environment 104, the web browser 108, the app with the engine 112, and the app with the engine 116. Some of the elements of a general purpose computer system 1500 are shown in FIG. 15 wherein a processor 1502 is shown having an input/output (I/O) section 1504, a central processing unit (CPU) 1506, and a memory section 1508. There may be one or more processors 1502, such that the processor 1502 of the computer system 1500 comprises a single central-processing unit 1506, or a plurality of processing units, commonly referred to as a parallel processing environment. The computer system 1500 may be a conventional computer, a server, a distributed computer, or any other type of computer, such as one or more external computers made available via a cloud computing architecture. The presently described technology is optionally implemented in software devices loaded in memory 1508, stored on a configured DVD/CD-ROM 1510 or storage unit 1512, and/or communicated via a wired or wireless network link 1514, thereby transforming the computer system 1500 in FIG. 15 to a special purpose machine for implementing the described operations.

The memory section 1508 may be volatile media, non-volatile media, removable media, non-removable media, and/or other media or mediums that can be accessed by a general purpose or special purpose computing device. For example, the memory section 1508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1504 is connected to one or more user-interface devices (e.g., a keyboard 1516 and a display unit 1518), a disc storage unit 1512, and a disc drive unit 1520. Generally, the disc drive unit 1520 is a DVD/CD-ROM drive unit capable of reading the DVD/CD-ROM medium 1510, which typically contains programs and data 1522. Computer program products containing mechanisms to effectuate the systems and methods in accordance with the presently described technology may reside in the memory section 1504, on a disc storage unit 1512, on the DVD/CD-ROM medium 1510 of the computer system 1500, or on external storage devices made available via a cloud computing architecture with such computer program products, including one or more database management products, web server products, application server products, and/or other additional software components. Alternatively, a disc drive unit 1520 may be replaced or supplemented by a floppy drive unit, a tape drive unit, or other storage medium drive unit. The network adapter 1524 is capable of connecting the computer system 1500 to a network via the network link 1514, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1500 is connected (by wired connection and/or wirelessly) to a local network through the network interface or adapter 1524, which is one type of communications device. When used in a WAN-networking environment, the computer system 1500 typically includes a modem, a network adapter, or any other type of communications device for establishing communications over the wide area network. In a networked environment, program modules depicted relative to the computer system 1500 or portions thereof, may be stored in a remote memory storage device. It is appreciated that the network connections shown are examples of communications devices for and other means of establishing a communications link between the computers may be used.

In an example implementation, source code executed by the app development computer system 102, the developer computer 106, the mobile computing device 110, and the app repository computer system 114, a plurality of internal and external databases, source databases, and/or cached data on servers are stored in memory 204 of the app development computer system 102, memory 304 of the developer computer 106, memory 404 of the mobile computing device 110, memory 504 of the app repository computer system 114, or other storage systems, such as the disk storage unit 1512 or the DVD/CD-ROM medium 1510, and/or other external storage devices made available and accessible via a network architecture. The source code executed by the app development computer system 102, the developer computer 106, the mobile computing device 110, and the app repository computer system 114 may be embodied by instructions stored on such storage systems and executed by the processor 1502.

Some or all of the operations described herein may be performed by the processor 1502, which is hardware. Further, local computing systems, remote data sources and/or services, and other associated logic represent firmware, hardware, and/or software configured to control operations of the mobile application development system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1502 and a user may interact with a Graphical User Interface (GUI) using one or more user-interface devices (e.g., the keyboard 1516 and the display unit 1518) with some of the data in use directly coming from online sources and data stores. The system set forth in FIG. 15 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine readable medium may include magnetic storage medium (e.g. floppy diskette), optical storage medium (e.g., CD-ROM); magneto-optical storage medium, read only memory (ROM); random access memory (RAM); erasable programmable memory (e.g., EPROM and EEPROM); or flash memory.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for updating mobile apps, comprising:
   at least one processor; and
   one or more computer storage media storing computer-usable instructions that, when used by the at least one processor, cause the at least one processor to:
   receive a request from a mobile computing device, the request including at least a first commitId and a first version number associated with an installed version of an app downloaded from an app repository computer system and installed on the mobile computing device, wherein the app includes an engine configured to parse an installed set of code files at runtime to construct native objects and data structures associated with the installed version of the app;
   retrieve, from a production repository, at least a second commitId associated with an updated version of the app, wherein the production repository includes an updated set of code files associated with the updated version of the app;
   determine that an update of the installed version of the app is necessary based at least in part on the retrieved second commitId being different than the first commitId associated with the installed version of the app
   in response to determining that the update of the installed version of the app is necessary, generate a file comprising at least one difference between the installed set of code files associated with the installed version of the app and the updated set of code files associated with the updated version of the app in the production repository; and
   transmit the generated file comprising the at least one difference to the mobile computing device, wherein the engine is further configured to update the installed set of code files with the generated file to install the updated version of the app.

2. The system of claim 1, the one or more computer storage media storing computer-usable instructions that, when used by the at least one processor, further cause the at least one processor to:
   retrieve, from the production repository, a second version number associated with the updated version of the app;
   determine that the engine is incompatible with the updated version of the app based on the retrieved second version number being different than the first version number associated with the installed version of the app; and
   in response to determining that the engine is incompatible with the updated version of the app, send a message to the mobile computing device indicating that the engine is incompatible with the updated version of the app and that the updated version of the app having a newer compatible engine is available for download from the app repository computer system.

3. The system of claim 1, the one or more computer storage media storing computer-usable instructions that, when used by the at least one processor, further cause the at least one processor to:
   check out, from the production repository, the at least one difference between the installed set of code files associated with the installed version of the app and the updated set of code files associated with the updated version of the app.

4. The system of claim 1, the one or more computer storage media storing computer-usable instructions that, when used by the at least one processor, further cause the at least one processor to:
   transmit the second commitId associated with the updated version of the app to the mobile computing device, wherein the engine is further configured to update an internal commitId from the first commitId to the second commitId.

5. The system of claim 1, wherein the generated file comprising the at least one difference comprises a zip archive.

6. The system of claim 1, wherein the production repository is a GIT repository.

7. The system of claim 1, wherein the first commitId represents a first key corresponding to an older version of the app stored in the production repository and corresponding to the installed version of the app, and wherein the second commitId represents a second key corresponding to the updated version of the app stored in the production repository.

8. The system of claim 1, wherein the generated file comprises an extensible markup language (XML) file having application description language (ADL) code.

9. A system, comprising:
   at least one processor; and
   one or more computer storage media storing computer-usable instructions that, when used by the at least one processor, cause the at least one processor to:
   receive login information from a developer computer;
   determine that the received login information is correct based on a comparison of the received login information with user account information in a database;
   provide a web-based app development environment to the developer computer based on the received login information being correct, wherein the transmitted web-based app development environment is configured to be provided for display by a web browser of the developer computer, facilitate development of app projects via the web browser of the developer computer, and store snapshots of the app projects as versions of an app into at least one repository associated with the received login information;
   transmit an existing version of a particular app project associated with an app to the developer computer;

receive an updated version of the particular app project having a set of code files corresponding thereto from the developer computer, the corresponding set of code files comprising an extensible markup language (XML) file having application description language (ADL) code;

create an app snapshot of the received updated version of the particular app project associated with the app for storage into a development repository associated with the received login information; and transmit the created app snapshot to a mobile computing device for testing thereon, the created app snapshot having an engine that corresponds to the received updated version of the particular app project and is configured to parse and render the corresponding set of code files at runtime to execute the app based thereon.

10. The system of claim 9, the one or more computer storage media storing computer-usable instructions that, when used by the at least one processor, further cause the at least one processor further to:

receive a certificate and provisioning information from the developer computer;

build a production version of the app based on the created app snapshot of the received updated version of the particular app project utilizing the certificate and the provisioning information;

store the built production version of the app, a version number, and a commitId into a production repository associated with the received login information; and transmit the built production version of the app to the developer computer.

11. A system, comprising:

at least one processor; and one or more computer storage media storing computer-usable instructions that, when used by the at least one processor, cause the at least one processor to:

install a first version of an app downloaded from an app repository computer system, the first version of the app having an engine, a first version number, a first commitId, and a first set of code files having at least one extensible markup language (XML) file comprising application description language (ADL) code, wherein the engine is configured to parse and render an installed set of code files at runtime to execute the app based on ADL code comprised therein;

in response to executing the installed first version of the app, transmit the first version number and the first commitId to an app development computer system;

receive, from the app development computer system, an archive file comprising at least one difference between the first version of the app and a second version of the app stored on the app development computer system, the second version of the app having a second version number, a second commitId and a second set of code files having at least one XML file comprising ADL code;

update, utilizing the engine, the installed app from the first version to the second version with extracted contents of the archive file, wherein the update includes at least changing the installed set of code files to match the second set of code files and changing an internal commitId from the first commitId to the second commitId;

parse, utilizing the engine, the updated installed set of code files to execute the second version of the app.

12. The system of claim 11, wherein the installed first version of the app is stored in a read-only file system.

13. The system of claim 11, wherein the received archive file comprising the at least one difference between the first version of the app and the second version of the app is stored in a read/write file system.

14. The system of claim 11, the one or more computer storage media storing computer-usable instructions that, when used by the at least one processor, further cause the at least one processor further to:

in response to parsing the updated installed set of code files, construct utilizing the engine, native objects and data structures associated with the second version of the app.

15. The system of claim 14, wherein the native objects comprise datasources.

16. The system of claim 15, wherein the datasources comprise at least one of web services, camera datasources, global positioning system (GPS) datasources, user contacts datasources, user calendar and event datasources, databases, user preferences, and in-app purchases.

17. A computer-implemented method, comprising:

receiving a request from a mobile computing device, the request including at least a first commitId and a first version number associated with an installed version of an app downloaded from an app repository computer system, wherein the app includes an engine configured to parse an installed set of code files at runtime to construct native objects and data structures corresponding to the installed version of the app;

retrieving, from a production repository, at least a second commitId associated with an updated version of the app stored therein, wherein the production repository includes an updated set of code files associated with the updated version of the app;

determining that an update of the installed version of the app is necessary based at least in part on the retrieved second commitId being different than the first commitId associated with the installed version of the app;

in response to determining that the update of the installed version of the app is necessary, generate a file comprising at least one difference between the installed set of code files associated with the installed version of the app and the updated set of code files associated with the updated version of the app stored in the production repository; and transmitting the generated file comprising the at least one difference to the mobile computing device, wherein the engine is further configured to update the installed set of code files with the generated file to install the updated version of the app.

18. The method of claim 17, further comprising:

retrieving, from the production repository, a second version number associated with the updated version of the app;

determining that the engine is incompatible with the updated version of the app based on the retrieved second version number being different than the first version number associated with the installed version of the app; and in response to determining that the engine is incompatible with the updated version of the app, sending a message to the mobile computing device indicating that the engine is incompatible with the updated version of the app and that the updated version of the app having a newer compatible engine is available for download from the app repository computer system.

19. The method of claim 17, further comprising:
checking out, from the production repository, the at least one difference between the installed set of code files associated with the installed version of the app and the updated set of code files associated with the updated version of the app.

20. The method of claim 17, further comprising:
transmitting the second commitId associated with the updated version of the app to the mobile computing device, wherein the engine is further configured to update an internal commitId from the first commitId to the second commitId.

21. The method of claim 17, wherein the generated file comprising the at least one difference comprises a zip archive.

22. The method of claim 17, wherein the production repository is a GIT repository.

23. The method of claim 17, wherein the first commitId represents a first key corresponding to an older version of the app stored in the production repository and corresponding to the installed version of the app, and wherein the second commitId represents a second key corresponding to the updated version of the app stored in the production repository.

24. The method of claim 17, wherein the generated file comprises an extensible markup language (XML) file having application description language (ADL) code.

25. A computer-implemented method, comprising:
receiving login information from a developer computer;
determining that the received login information is correct based on a comparison of the received login information with user account information in a database;
providing a web-based app development environment to the developer computer based on the received login information being correct, wherein the transmitted web-based app development environment is configured to be provided for display by a web browser of the developer computer, facilitate development of app projects via the web browser of the developer computer, and store snapshots of the app projects as versions of an app into at least one repository associated with the received login information;
transmitting an existing version of a particular app project associated with an app to the developer computer;
receiving a second an updated version of the particular app project having a set of code files corresponding thereto from the developer computer, the corresponding set of code files comprising an extensible markup language (XML) file having application description language (ADL) code;
creating an app snapshot of the received updated version of the particular app project associated with the app for storage into a development repository associated with the received login information; and
transmitting the created app snapshot to a mobile computing device for testing thereon, the created app snapshot having an engine that corresponds to the received updated version of the particular app project and is configured to parse and render the corresponding set of code files at runtime to execute the app based thereon.

26. The method of claim 25, further comprising:
receiving a certificate and provisioning information from the developer computer;
building a production version of the app based on the created app snapshot of the received updated version of the particular app project utilizing the certificate and the provisioning information;
storing the built production version of the app, a version number, and a commitId into a production repository associated with the received login information; and
transmitting the built production version of the app to the developer computer.

27. A computer-implemented method, comprising:
installing a first version of an app downloaded from an app repository computer system, the first version of the app having an engine, a first version number, a first commitId, and a first set of code files having at least one extensible markup language (XML) file comprising application description language (ADL) code, wherein the engine is configured to parse and render an installed set of code files at runtime to execute the app based on ADL code comprised therein;
in response to executing the installed first version of the app, transmit the first version number and the first commitId to an app development computer system;
receiving an archive file comprising at least one difference between the first version of the app and a second version of the app stored on the app development computer system, the second version of the app having a second version number, a second commitId and a second set of code files having at least one XML file comprising ADL code;
updating, utilizing the engine, the installed app from the first version to the second version with extracted contents of the archive file, wherein the update includes at least changing the installed set of code files to match the second set of code files and changing an internal commitId from the first commitId to the second commitId;
parsing, utilizing the engine, the updated installed set of code files to execute the second version of the app.

28. The method of claim 27, wherein the installed first version of the app is stored in a read-only file system.

29. The method of claim 27, wherein the received archive file comprising the at least one difference between the first version of the app and the second version of the app is stored in a read/write file system.

30. The method of claim 27, further comprising:
in response to parsing the updated installed set of code files, constructing utilizing the engine, native objects and data structures associated with the second version of the app.

31. The method of claim 30, wherein the native objects comprise datasources.

32. The method of claim 31, wherein the datasources comprise at least one of web services, camera datasources, global positioning system (GPS) datasources, user contacts datasources, user calendar and event datasources, databases, user preferences, and in-app purchases.

33. A non-transitory computer-readable medium having instructions stored thereon that, when executed by at least one processor, cause the at least one processor to perform operations comprising:
receiving a request from a mobile computing device, the request including at least a first commitId and a first version number associated with an installed version of an app downloaded from an app repository computer system, wherein the app includes an engine configured to parse an installed set of code files at runtime to construct native objects and data structures corresponding to the installed version of the app;
retrieving, from a production repository, at least a second commitId associated with an updated version of the app stored therein, wherein the production repository includes an updated set of code files associated with the updated version of the app;

determining that an update of the installed version of the app is necessary based at least in part on the retrieved second commitId being different than the first commitId associated with the installed version of the app;

in response to determining that the update of the installed version of the app is necessary, generate a file comprising at least one difference between the installed set of code files associated with the installed version of the app and the updated set of code files associated with the updated version of the app stored in the production repository; and transmitting the generated file comprising the at least one difference to the mobile computing device, wherein the engine is further configured to update the installed set of code files with the generated file to install the updated version of the app.

34. A non-transitory computer-readable medium having instructions stored thereon that, when executed by at least one processor, cause the at least one processor to perform operations comprising:

receiving login information from a developer computer;

determining that the received login information is correct based on a comparison of the received login information with user account information in a database;

providing a web-based app development environment to the developer computer based on the received login information being correct, wherein the transmitted web-based app development environment is configured to be provided for display by a web browser of the developer computer, facilitate development of app projects via the web browser of the developer computer, and store snapshots of the app projects as versions of an app into at least one repository associated with the received login information;

transmitting an existing version of a particular app project associated with an app to the developer computer;

receiving an updated version of the particular app project having a set of code files corresponding thereto from the developer computer, the corresponding set of code files comprising an extensible markup language (XML) file having application description language (ADL) code;

creating an app snapshot of the received updated version of the particular app project associated with the app for storage into a development repository associated with the received login information; and transmitting the created app snapshot to a mobile computing device for testing thereon, the created app snapshot having an engine that corresponds to the received updated version of the particular app project and is configured to parse and render the corresponding set of code files at runtime to execute the app based thereon.

35. A non-transitory computer-readable medium having instructions stored thereon that, when executed by at least one processor, cause the at least one processor to perform operations comprising:

installing a first version of an app downloaded from an app repository computer system, the first version of the app having an engine, a first version number, a first commitId, and a first set of code files having at least one extensible markup language (XML) file comprising application description language (ADL) code, wherein the engine is configured to parse and render an installed set of code files at runtime to execute the app based on ADL code comprised therein;

in response to executing the installed first version of the app, transmit the first version number and the first commitId to an app development computer system;

receiving, from the app development computer system, an archive file comprising at least one difference between the first version of the app and a second version of the app stored on the app development computer system, the second version of the app having a second version number, a second commitId and a second set of code files having at least one XML file comprising ADL code;

updating, utilizing the engine, the installed app from the first version to the second version with extracted contents of the archive file, wherein the update includes at least changing the installed set of code files to match the second set of code files and changing an internal commitId from the first commitId to the second commitId;

parsing, utilizing the engine, the updated installed set of code files to execute the second version of the app.

* * * * *